(12) United States Patent
Na et al.

(10) Patent No.: US 12,338,308 B2
(45) Date of Patent: Jun. 24, 2025

(54) MODIFIED CONJUGATED DIENE-BASED POLYMER, METHOD FOR PREPARING THE SAME AND RUBBER COMPOSITION INCLUDING THE SAME

(71) Applicant: LG Chem, Ltd., Seoul (KR)

(72) Inventors: Youk Reol Na, Daejeon (KR); Ro Mi Lee, Daejeon (KR); Suk Joon Yoo, Daejeon (KR); Geun Seung Baek, Daejeon (KR); Hye Jung Shin, Daejeon (KR); You Seok Seo, Daejeon (KR); Hyeon Jong Park, Daejeon (KR); Hye Young Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 654 days.

(21) Appl. No.: 17/440,994

(22) PCT Filed: Sep. 11, 2020

(86) PCT No.: PCT/KR2020/012333
§ 371 (c)(1),
(2) Date: Sep. 20, 2021

(87) PCT Pub. No.: WO2021/049916
PCT Pub. Date: Mar. 18, 2021

(65) Prior Publication Data
US 2022/0162363 A1    May 26, 2022

(30) Foreign Application Priority Data

Sep. 11, 2019  (KR) .................. 10-2019-0113004
Sep. 10, 2020  (KR) .................. 10-2020-0116220
Sep. 10, 2020  (KR) .................. 10-2020-0116221

(51) Int. Cl.
*C08F 236/14*    (2006.01)
*C08F 8/42*      (2006.01)
*C08K 3/36*      (2006.01)
*C08K 5/544*     (2006.01)

(52) U.S. Cl.
CPC .............. *C08F 236/14* (2013.01); *C08F 8/42* (2013.01); *C08K 3/36* (2013.01); *C08K 5/544* (2013.01)

(58) Field of Classification Search
CPC ........ C08F 236/14; C08F 8/42; C08F 236/06; C08F 236/10; C08F 279/02; C08F 8/30; C08F 230/08; C08F 236/04; C08K 3/36; C08K 5/544; Y02T 10/86; C08C 19/22; C08C 19/25; C08L 51/04; C08L 15/00; C08L 9/06
See application file for complete search history.

(56) References Cited

U.S. PATENT DOCUMENTS

| | | | |
|---|---|---|---|
| 4,397,994 A | 8/1983 | Takeuchi et al. | |
| 4,835,216 A | 5/1989 | Morikawa et al. | |
| 5,241,008 A | 8/1993 | Hall | |
| 7,964,674 B2 | 6/2011 | Sasagawa et al. | |
| 8,071,676 B2 * | 12/2011 | Matsuda | C09J 151/04 |
| | | | 525/379 |
| 8,106,130 B2 | 1/2012 | Fukuoka et al. | |
| 8,501,849 B2 | 8/2013 | Cruse et al. | |
| 8,946,339 B2 * | 2/2015 | Yoshida | C08C 19/44 |
| | | | 524/493 |
| 9,243,090 B2 | 1/2016 | Arriola et al. | |
| 9,315,600 B2 | 4/2016 | Hayata et al. | |
| 9,550,839 B2 | 1/2017 | Kaszas et al. | |
| 10,676,542 B2 | 6/2020 | Dire et al. | |
| 2003/0100683 A1 | 5/2003 | Toyoizumi et al. | |
| 2004/0106724 A1 | 6/2004 | Toratani et al. | |
| 2004/0254301 A1 | 12/2004 | Tsukimawashi et al. | |
| 2005/0070672 A1 | 3/2005 | Ozawa et al. | |
| 2008/0033110 A1 | 2/2008 | Suzuki et al. | |
| 2009/0203843 A1 | 8/2009 | Fukuoka et al. | |
| 2009/0292043 A1 | 11/2009 | Kurazumi et al. | |
| 2010/0016499 A1 | 1/2010 | Oshima | |
| 2010/0056711 A1 | 3/2010 | Fujii et al. | |
| 2010/0113683 A1 | 5/2010 | Matsumoto et al. | |
| 2010/0152369 A1 | 6/2010 | Shibata et al. | |
| 2010/0179274 A1 | 7/2010 | Jinbo et al. | |

(Continued)

FOREIGN PATENT DOCUMENTS

| | | |
|---|---|---|
| CN | 1411472 A | 4/2003 |
| CN | 1578790 A | 2/2005 |

(Continued)

OTHER PUBLICATIONS

Honda, JP-2014136758-MT (Year: 2014).*
Extended European Search Report including Written Opinion for Application No. 20863524.3 dated Feb. 10, 2022, pp. 1-6.
Extended European Search Report including Written Opinion for Application No. 20864068.0 dated Feb. 25, 2022, pp. 1-8.
International Search Report for Application No. PCT/KR2020/012323, mailed Dec. 16, 2020, pp. 1-3.
International Search Report for Application No. PCT/KR2020/012326, mailed Dec. 21, 2020, pp. 1-3.

(Continued)

*Primary Examiner* — Liam J Heincer
*Assistant Examiner* — Zhen Liu
(74) *Attorney, Agent, or Firm* — Lerner David LLP

(57) ABSTRACT

A modified conjugated diene-based polymer, a rubber composition including the same, and a method of making the same are disclosed herein. The modified conjugated diene-based polymer has excellent processability and good tensile strength and viscoelasticity. In some embodiments, a modified conjugated diene-based polymer includes a first chain including a repeating unit derived from a conjugated diene-based monomer, a second chain including a repeating unit derived from a compound represented by Formula 1, and a derived unit from an alkoxysilane-based modifier, wherein the first chain and the second chain are coupled by the derived unit from the alkoxysilane-based modifier.

10 Claims, No Drawings

(56) References Cited

U.S. PATENT DOCUMENTS

| | | | |
|---|---|---|---|
| 2011/0160388 | A1 | 6/2011 | Tanaka et al. |
| 2011/0178233 | A1 | 7/2011 | Chaboche et al. |
| 2011/0275756 | A1 | 11/2011 | Ito et al. |
| 2012/0108737 | A1 | 5/2012 | Shibata et al. |
| 2012/0220716 | A1 | 8/2012 | Nakatani et al. |
| 2013/0023624 | A1 | 1/2013 | Sekikawa et al. |
| 2013/0079464 | A1 | 3/2013 | Nishioka et al. |
| 2013/0085225 | A1 | 4/2013 | Nishioka et al. |
| 2013/0090422 | A1 | 4/2013 | Hinohara et al. |
| 2013/0158205 | A1 | 6/2013 | Lee et al. |
| 2014/0031471 | A1 | 1/2014 | Rademacher et al. |
| 2014/0088256 | A1 | 3/2014 | Fujii |
| 2014/0114014 | A1 | 4/2014 | Tokimune et al. |
| 2014/0243476 | A1 | 8/2014 | Lee et al. |
| 2014/0256847 | A1* | 9/2014 | Sato .............. C08L 47/00 523/156 |
| 2014/0296376 | A1 | 10/2014 | Sato et al. |
| 2014/0371383 | A1 | 12/2014 | Hayata et al. |
| 2015/0073166 | A1 | 3/2015 | Nakatani et al. |
| 2015/0099823 | A1 | 4/2015 | Imoto et al. |
| 2015/0166738 | A1 | 6/2015 | DeDecker et al. |
| 2015/0252133 | A1 | 9/2015 | Morita et al. |
| 2016/0096909 | A1 | 4/2016 | Sekikawa et al. |
| 2016/0122480 | A1 | 5/2016 | Cho et al. |
| 2016/0347877 | A1 | 12/2016 | Lee et al. |
| 2017/0066850 | A1 | 3/2017 | Lee et al. |
| 2017/0275400 | A1 | 9/2017 | Hirata et al. |
| 2017/0283518 | A1 | 10/2017 | Maejima et al. |
| 2017/0291997 | A1 | 10/2017 | Cho et al. |
| 2018/0016423 | A1 | 1/2018 | Tsukada |
| 2018/0030070 | A1 | 2/2018 | Rossle et al. |
| 2018/0030173 | A1 | 2/2018 | Kang et al. |
| 2018/0037674 | A1 | 2/2018 | Yamada et al. |
| 2018/0072821 | A1 | 3/2018 | Janowski et al. |
| 2018/0162959 | A1 | 6/2018 | Choi et al. |
| 2018/0170102 | A1 | 6/2018 | Lee et al. |
| 2018/0223006 | A1 | 8/2018 | Lee et al. |
| 2018/0223088 | A1 | 8/2018 | Sohn et al. |
| 2018/0258194 | A1 | 9/2018 | Sohn et al. |
| 2018/0371113 | A1 | 12/2018 | Lee et al. |
| 2018/0371114 | A1 | 12/2018 | Lee et al. |
| 2019/0002598 | A1 | 1/2019 | Lee et al. |
| 2019/0048115 | A1 | 2/2019 | Lee et al. |
| 2019/0169406 | A1 | 6/2019 | Rossle et al. |
| 2019/0203021 | A1 | 7/2019 | Kyo et al. |
| 2019/0233547 | A1 | 8/2019 | Mun et al. |
| 2019/0256635 | A1 | 8/2019 | Kim et al. |
| 2019/0263956 | A1 | 8/2019 | Kim et al. |
| 2019/0300638 | A1 | 10/2019 | Cho et al. |
| 2020/0024383 | A1 | 1/2020 | Yasumoto et al. |
| 2020/0216578 | A1 | 7/2020 | Aoshima et al. |
| 2020/0223968 | A1 | 7/2020 | Sohn et al. |
| 2020/0354482 | A1 | 11/2020 | Lee et al. |
| 2020/0377636 | A1 | 12/2020 | Rössle et al. |
| 2021/0171689 | A1 | 6/2021 | Lee et al. |
| 2021/0253767 | A1 | 8/2021 | Lee et al. |
| 2021/0301046 | A1 | 9/2021 | Sekikawa et al. |

FOREIGN PATENT DOCUMENTS

| | | | |
|---|---|---|---|
| CN | 1592760 | A | 3/2005 |
| CN | 101659730 | A | 3/2010 |
| CN | 102083889 | A | 6/2011 |
| CN | 103764682 | A | 4/2014 |
| CN | 106029708 | A | 10/2016 |
| CN | 107614538 | A | 1/2018 |
| CN | 108026187 | A | 5/2018 |
| CN | 108350118 | A | 7/2018 |
| CN | 108699179 | A | 10/2018 |
| CN | 109563180 | A | 4/2019 |
| CN | 109563186 | A | 4/2019 |
| CN | 109863186 | A | 6/2019 |
| CN | 109890851 | A | 6/2019 |
| CN | 109923136 | A | 6/2019 |
| CN | 111201255 | A | 5/2020 |
| EA | 20173 | B1 | 9/2014 |
| EP | 2597117 | A1 | 5/2013 |
| EP | 2772514 | A1 | 9/2014 |
| JP | H08337614 | A | 12/1996 |
| JP | 3378313 | B2 | 2/2003 |
| JP | 2008101127 | A | 5/2008 |
| JP | 2010077416 | A | 4/2010 |
| JP | 2011080023 | A | 4/2011 |
| JP | 2011219701 | A | 11/2011 |
| JP | 2011252137 | A | 12/2011 |
| JP | 4966652 | B2 | 7/2012 |
| JP | 2013108035 | A | 6/2013 |
| JP | 2013127064 | A | 6/2013 |
| JP | 2013204003 | A | 10/2013 |
| JP | 2014055264 | A | 3/2014 |
| JP | 2014125543 | A | 7/2014 |
| JP | 2014136758 | A * | 7/2014 |
| JP | 2014162870 | A | 9/2014 |
| JP | 2015007151 | A | 1/2015 |
| JP | 2015054910 | A | 3/2015 |
| JP | 2015101658 | A | 6/2015 |
| JP | 2015120792 | A | 7/2015 |
| JP | 2015120803 | A | 7/2015 |
| JP | 2016065188 | A | 4/2016 |
| JP | 6085077 | B2 | 2/2017 |
| JP | 201828047 | A | 2/2018 |
| JP | 2018030906 | A | 3/2018 |
| JP | 2018035241 | A | 3/2018 |
| JP | 2018512385 | A | 5/2018 |
| JP | 2018513896 | A | 5/2018 |
| JP | 2018119104 | A | 8/2018 |
| JP | 2018119106 | A | 8/2018 |
| JP | 2018534401 | A | 11/2018 |
| JP | 2019501228 | A | 1/2019 |
| JP | 2019523805 | A | 8/2019 |
| KR | 100237192 | B1 | 1/2000 |
| KR | 20080044880 | A | 5/2008 |
| KR | 100932356 | B1 | 12/2009 |
| KR | 20120083387 | A | 7/2012 |
| KR | 20130090811 | A | 8/2013 |
| KR | 20130093587 | A | 8/2013 |
| KR | 101432412 | B1 | 8/2014 |
| KR | 20150060697 | A | 6/2015 |
| KR | 20160031712 | A | 3/2016 |
| KR | 20160032708 | A | 3/2016 |
| KR | 20160042952 | A | 4/2016 |
| KR | 20160053521 | A | 5/2016 |
| KR | 20160062950 | A | 6/2016 |
| KR | 20160067489 | A | 6/2016 |
| KR | 20160076248 | A | 6/2016 |
| KR | 20160079323 | A | 7/2016 |
| KR | 20170000810 | A | 1/2017 |
| KR | 20170074677 | A | 6/2017 |
| KR | 20170076575 | A | 7/2017 |
| KR | 20170076588 | A | 7/2017 |
| KR | 20170076596 | A | 7/2017 |
| KR | 20170118708 | A | 10/2017 |
| KR | 20170121694 | A | 11/2017 |
| KR | 20170142492 | A | 12/2017 |
| KR | 20180060976 | A | 6/2018 |
| KR | 20180064212 | A | 6/2018 |
| KR | 20180080639 | A | 7/2018 |
| KR | 101926619 | B1 | 12/2018 |
| KR | 20190020061 | A | 2/2019 |
| KR | 20190030216 | A | 3/2019 |
| KR | 20190038287 | A | 4/2019 |
| KR | 20190128578 | A | 11/2019 |
| KR | 102101005 | B1 | 4/2020 |
| KR | 20200078401 | A | 7/2020 |
| RU | 2425845 | C2 | 8/2011 |
| RU | 2568475 | C2 | 11/2015 |
| RU | 2574246 | C2 | 2/2016 |
| RU | 2597080 | C2 | 9/2016 |
| RU | 2603370 | C2 | 11/2016 |
| RU | 2605250 | C9 | 4/2017 |
| RU | 2649008 | C2 | 3/2018 |
| RU | 2671351 | C2 | 10/2018 |
| RU | 2670897 | C9 | 12/2018 |

(56) References Cited

FOREIGN PATENT DOCUMENTS

| | | | |
|---|---|---|---|
| RU | 2675525 C1 | 12/2018 | |
| SG | 10201800555 T | 8/2018 | |
| TW | 200829613 A | 7/2008 | |
| WO | 2003029299 A1 | 4/2003 | |
| WO | 2008123163 A1 | 10/2008 | |
| WO | 2008123164 A1 | 10/2008 | |
| WO | 2013031599 A1 | 3/2013 | |
| WO | 2017216344 A1 | 12/2017 | |
| WO | 2018025998 A1 | 2/2018 | |
| WO | 2018034194 A1 | 2/2018 | |
| WO | 2018034217 A1 | 2/2018 | |
| WO | 2018128290 A1 | 7/2018 | |
| WO | 2019020752 A1 | 1/2019 | |

OTHER PUBLICATIONS

Kozlov, N.A. et al., "Physics of Polymers", Textbook/ Vladimir State University, Vladimir, 2001], p. 345 (p. 230, 234-242, 244-246, 253) [Partial Translation Attached].

Sutyagin, V.M. et al., "Chemistry and Physics of Polymers," Textbook, Tomsk, TPU Publishing House, 2003], p. 208, (p. 132, 140-142, 150-151 and 173) [Partial Translation Attached].

Dockendorff, J. et al., "Synthesis of Arborescent Polystyrene-g-[poly(2-vinylpyridine)-b-polystyrene] Core-Shell-Corona Copolymers," Journal of PolymerScience Part A: Polymer Chemistry, Feb. 2014, vol. 52, No. 8, pp. 1075-1085.

International Search Report for Application No. PCT/KR2020/012316, dated Dec. 16, 2020, 3 pages.

International Search Report for Application No. PCT/KR2020/012319, dated Dec. 16, 2020, 3 pages.

International Search Report for Application No. PCT/KR2020/012312 mailed Dec. 16, 2020, pp. 1-2.

International Search Report for Application No. PCT/KR2020/012333 mailed Dec. 11, 2020, pp. 1-2.

International Search Report for Application No. PCT/KR2020/012329 mailed Dec. 21, 2020; 2 pages.

Schroot, R. et al., "Accumulative Charging of Redox-Active Side-Chain-Modified Polymers: Experimental and Computational Insights from Oligo- to Polymeric Triarylamines", Macromolecules, Jun. 2019, pp. 4673-4685, vol. 52, American Chemical Society.

Sun C. et al., "Improvement of Silica Dispersion in Solution Polymerized Styrene-Butadiene Rubber via Introducing Amino Functional Groups" Industrial & Engineering Chemistry Research, Dec. 2018, pp. 1454-1461, vol. 58, American Chemical Society.

Third Party Observation for European Application No. 20863524.3 issued Sep. 15, 2022. 5 pgs.

"TDS M2520", WeConnectScience, Feb. 15, 2022, LG Chem. 1 pg.

"TDS SOL-5271H", SSBR Technical Data Sheet, Kumho Petrochemical [retrieved from the Notification of the Third Party Observation issued on Sep. 15, 2022 for European Application No. 20863524.3 which is a counterpart of the U.S. Appl. No. 17/420,235]. 1 pg.

"SOLFLEX 30H41", Technical Data Sheet, Goodyear Tire & Rubber Company [retrieved from the Notification of the Third Party Observation issued on Sep. 15, 2022 for European Application No. 20863524.3 which is a counterpart of the U.S. Appl. No. 17/420,235]. 1 pg.

"TDS 2550", WeConnectScience, Feb. 15, 2022, LG Chem. 1 pg.

"TDS 2550H", WeConnectScience, Feb. 15, 2022, LG Chem. 1 pg.

"TDS F3438" WeConnectScience, Feb. 15, 2022, LG Chem. 1 pg.

"TDS F3626E", WeConnectScience, Feb. 15, 2022, LG Chem. 1 pg.

Search Report dated Dec. 6, 2022 and Written Opinion dated Dec. 20, 2022 for Singapore Application No. 11202110158P , 10 pages.

Extended European Search Report for Application No. 20862533.5 dated Jun. 3, 2022, pp. 1-5.

Extended European Search Report for Application No. 20863407.1 dated Jul. 11, 2022, pp. 1-5.

Wikipedia titled Anionic addition polymerization, access date Dec. 23, 2024, 3 pages.

Wikipedia titled Copolymer, access date Dec. 23, 2024, 5 pages.

Yamada, C. et al., "Influence of functionalized S-SBR on silica-filled rubber compound properties", University of Twente, AsahiKasei, Jul. 2018, 11 pages.

\* cited by examiner

MODIFIED CONJUGATED DIENE-BASED POLYMER, METHOD FOR PREPARING THE SAME AND RUBBER COMPOSITION INCLUDING THE SAME

CROSS-REFERENCE TO RELATED APPLICATIONS

The present application is a national phase entry under 35 U.S.C. § 371 of International Application No. PCT/KR2020/012333, filed on Sep. 11, 2020, which claims priority from Korean Patent Application No. 10-2019-0113004, filed on Sep. 11, 2019, and Korean Patent Application No. 10-2020-0116220 and Korean Patent Application No. 10-2020-0116221, filed on Sep. 10, 2020, the entire contents of which are incorporated by reference herein.

TECHNICAL FIELD

The present invention relates to a modified conjugated diene-based polymer which has excellent processability and good tensile strength and viscoelasticity properties, a method for preparing the same and a rubber composition including the same.

BACKGROUND ART

According to the recent demand for cars having a low fuel consumption ratio, a conjugated diene-based polymer having modulational stability represented by wet skid resistance as well as low rotation resistance, and excellent abrasion resistance and tensile properties is required as a rubber material for tires.

In order to reduce the rotation resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as rotation resistance and braking force, required for tires may be controlled, and fuel consumption may be reduced by appropriately adjusting the glass transition temperature. The solution-polymerized SBR is prepared by using an anionic polymerization initiator and is being used by coupling or modifying the chain terminals of the polymer thus formed to introduce a functional group at the terminal using various modifiers. For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a coupling agent such as a tin compound.

Meanwhile, as the modifier for introducing the functional group to the chain terminal of a polymer, technique of applying an aminoalkoxysilane-based modifier including an alkoxysilane group and an amine group in a molecule at the same time for maximizing the dispersibility and reactivity of a filler is widely known. However, if the number of the amine groups in the modifier increases, there are problems in that the solubility in a hydrocarbon solvent used for preparing a polymer may decrease, and easy modification reaction may become difficult.

PRIOR ART DOCUMENT (Patent Document 1) U.S. Pat. No. 4,397,994 A

DISCLOSURE OF THE INVENTION

Technical Problem

The present invention has been devised to solve the above-mentioned problems of the conventional technique, and an object is to provide a modified conjugated diene-based polymer including a second chain including a repeating unit derived from a compound represented by Formula 1 and a derived unit from an alkoxysilane-based modifier, and having excellent affinity with a filler.

In addition, an object of the present invention is to provide a method for preparing the modified conjugated diene-based polymer including reacting a modified active polymer first chain and a second chain derived from a macromonomer, wherein the macromonomer includes a repeating unit derived from a compound represented by Formula 1. After the reaction, the modified conjugated diene-based polymer includes the first chain and the second chain coupled by the derived unit from an alkoxysilane-based modifier.

Also, an object of the present invention is to provide a rubber composition including the modified conjugated diene-based polymer.

Technical Solution

To solve the above-described tasks, according to an embodiment of the present invention, the present invention provides a modified conjugated diene-based polymer including: a first chain including a repeating unit derived from a conjugated diene-based monomer; a second chain including a repeating unit derived from a compound represented by the following Formula 1; and a derived unit from an alkoxysilane-based modifier, wherein the first chain and the second chain are coupled by the derived unit of the modifier:

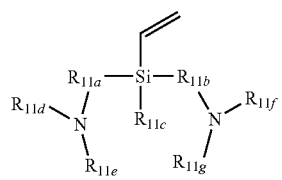

[Formula 1]

in Formula 1, $R_{11a}$ and $R_{11b}$ are each independently a single bond or a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, wherein the substituent is an alkyl group of 1 to 10 carbon atoms, a cycloalkyl group of 5 to 10 carbon atoms, or an aryl group of 6 to 20 carbon atoms, $R_{11c}$ is an alkyl group of 1 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; or a heterocyclic group of 3 to 20 carbon atoms, and $R_{11d}$ to $R_{11g}$ are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a mono-substituted, di-substituted or tri-substituted alkylsilyl group with alkyl groups of 1 to 10 carbon atoms.

In addition, the present invention provides a method for preparing the conjugated diene-based polymer including: polymerizing a conjugated diene-based monomer, or a conjugated diene-based monomer and an aromatic vinyl-based monomer in the presence of a polymerization initiator in a hydrocarbon solvent to prepare an active first chain (S1); reacting the active first chain with an alkoxysilane-based modifier to prepare a modified active first chain (S2); and reacting the modified active first chain and a macromonomer including a repeating unit derived from a compound represented by the following Formula 1 (S3):

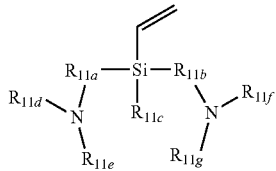

[Formula 1]

in Formula 1, $R_{11a}$ and $R_{11b}$ are each independently a single bond or a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, wherein the substituent is an alkyl group of 1 to 10 carbon atoms, a cycloalkyl group of 5 to 10 carbon atoms, or an aryl group of 6 to 20 carbon atoms, $R_{11c}$ is an alkyl group of 1 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; or a heterocyclic group of 3 to 20 carbon atoms, and $R_{11d}$ to $R_{11g}$ are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a mono-substituted, di-substituted or tri-substituted alkylsilyl group with alkyl groups of 1 to 10 carbon atoms.

Also, the present invention provides a rubber composition including the modified conjugated diene-based polymer and a filler.

Advantageous Effects

The modified conjugated diene-based polymer according to the present invention is prepared by a preparation method including a step of reacting a modified active first chain and a macromonomer including a repeating unit derived from a compound represented by Formula 1 after modification reaction, and may include a functional group derived from the compound represented by Formula 1 in a polymer molecular chain separately from a functional group derived from a modifier, thereby may have excellent affinity with a filler.

In addition, the method for preparing a modified conjugated diene-based polymer according to the present invention includes a step of reacting a macromonomer including a repeating unit derived from the compound represented by Formula 1 after modification reaction, and a modified conjugated diene-based polymer with a high modification ratio may be prepared by introducing a functional group derived from the compound represented by Formula 1, for example, an amine group to a polymer separately from the modifier.

Also, the rubber composition according to the present invention includes the modified conjugated diene-based polymer and may show excellent effects of tensile properties and viscoelasticity properties.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries, and the words or terms should be interpreted as having a meaning that is consistent with their meaning of the technical idea of the invention, based on the principle that an inventor may properly define the meaning of the words or terms to best explain the invention.

DEFINITION OF TERMS

The term "macromonomer" used in the present disclosure is a monomer unit of two or more repeating units derived from a polymerization reactive monomer, and may be combined with a polymer chain or a reactive compound through a terminal group.

The term "polymer" used in the present disclosure refers to a polymer compound prepared by polymerizing monomers of the same or different type. Thus, the common term, polymer refers to a polymer prepared from one type of a monomer, but includes a commonly used homopolymer and a copolymer.

The term "first chain (main chain)" used in the present disclosure may mean the molecular chain of a main skeleton forming a polymer, and may mean a chain mainly including repeating units of a conjugated diene-based monomer, or a conjugated diene-based monomer and an aromatic vinyl-based monomer, and the term "second chain (sub chain)" may mean a chain having a smaller number of repeating units than the first chain and mainly including the repeating unit derived from the compound represented by Formula 1.

The term "vinyl content" used in the present disclosure refers to the mass (or weight) percent of butadiene included in 1 and 2 positions in a polymer chain on the basis of a conjugated diene monomer (butadiene, etc.) moiety in the polymer (on the basis of the total weight of polymerized butadiene).

The term "monovalent hydrocarbon group" used in the present disclosure may mean a monovalent atomic group obtained by bonding carbon and hydrogen, in a monovalent alkyl group, alkenyl group, alkynyl group, cycloalkyl group, cycloalkyl group including one or more unsaturated bonds, and aryl group. The minimum carbon number of a substituent represented by the monovalent hydrocarbon may be determined according to the type of each substituent.

The term "divalent hydrocarbon group" used in the present disclosure may mean a divalent atomic group obtained by bonding carbon and hydrogen, in a divalent alkylene group, alkenylene group, alkynylene group, cycloalkylene group, cycloalkylene group including one or more unsaturated bonds and arylene group. The minimum carbon number of a substituent represented by the divalent hydrocarbon may be determined according to the type of each substituent.

The term "alkyl group" used in the present disclosure may mean monovalent aliphatic saturated hydrocarbon, and may include a linear alkyl group such as methyl, ethyl, propyl and butyl; and a branched alkyl group such as isopropyl, sec-butyl, tert-butyl and neo-pentyl.

The term "alkenyl group" used in the present disclosure may mean a monovalent aliphatic unsaturated hydrocarbon including one or two or more double bonds.

The term "alkynyl group" used in the present disclosure may mean a monovalent aliphatic unsaturated hydrocarbon including one or two or more triple bonds.

The term "alkylene group" used in the present disclosure may mean divalent aliphatic saturated hydrocarbon such as methylene, ethylene, propylene and butylene.

The term "aryl group" used in the present disclosure may mean aromatic hydrocarbon, and may include both monocyclic aromatic hydrocarbon in which one ring is formed, and polycyclic aromatic hydrocarbon in which two or more rings are bonded.

The term "heterocyclic group" used in the present disclosure is a cycloalkyl group or an aryl group of which carbon atoms are substituted with one or more heteroatoms, for example, may mean a heterocycloalkyl group or a heteroaryl group.

The term "substituted" used in the present disclosure may mean that the hydrogen of a functional group, an atomic group or a compound is substituted with a specific substituent. If the hydrogen of a functional group, an atomic group or a compound is substituted with a specific substituent, one or a plurality including two or more of substituents may be present according to the number of hydrogen present in the functional group, the atomic group or the compound, and if a plurality of substituents are present, each substituent may be the same or different.

The term "single bond" used in the present disclosure may mean a single covalent bond itself excluding a separate atomic or molecular group.

The term "derived unit", "derived repeating unit" and "derived functional group" used in the present disclosure may represent a component or a structure comes from a certain material, or the material itself.

It will be further understood that the terms "comprising", "including", and "having" and the derivatives thereof in the present disclosure, though these terms are particularly disclosed or not, do not preclude the presence or addition of optional components, steps, or processes. In order to avoid any uncertainty, all components claimed by using the term "comprising" may include additional additives, auxiliaries, or compounds, including a polymer or other materials, unless described to the contrary. In contrast, the term "consisting essentially of ~" excludes unnecessary ones for operation and precludes optional other components, steps or processes from the scope of optional explanation. The term "consisting of ~" precludes optional components, steps or processes, which are not particularly described or illustrated.

Measurement Methods and Conditions

In the present disclosure, the "vinyl content" is measured and analyzed using Varian VNMRS 500 MHz NMR, and the 1,2-vinyl bond content in a total polymer is calculated and measured by using 1,1,2,2-tetrachloroethane as a solvent during measuring NMR, and calculating 6.0 ppm as a solvent peak, 7.2-6.9 ppm as random styrene peaks, 6.9-6.2 ppm as block styrene peaks, 5.8-5.1 ppm as 1,4-vinyl and 1,2-vinyl peaks, and 5.1-4.5 ppm as 1,2-vinyl peaks.

In the present disclosure, "weight average molecular weight (Mw)", "number average molecular weight (Mn)", and "molecular weight distribution (MWD)" are measured through gel permeation chromatography (GPC) analysis and are measured by checking a molecular weight distribution curve. The molecular weight distribution (PDI, MWD, Mw/Mn) is calculated from each molecular weight measured. Particularly, the GPC uses two columns of PLgel Olexis (Polymer laboratories Co.) and one column of PLgel mixed-C (Polymer Laboratories Co.) in combination, and polystyrene (PS) is used as a GPC standard material for calculating the molecular weights, and tetrahydrofuran mixed with 2 wt % of an amine compound is used as a GPC measurement solvent.

In the present disclosure, the "N content" may be measured, for example, through an NSX analysis method, and measurement by the NSX analysis method may use a quantitative analyzer of a trace amount of nitrogen (NSX-2100H). For example, in case of using the quantitative analyzer of a trace amount of nitrogen, the quantitative analyzer of a trace amount of nitrogen (Auto sampler, Horizontal furnace, PMT & Nitrogen detector) is turned on, carrier gas flow amounts are set to 250 ml/min for Ar, 350 ml/min for $O_2$, and 300 ml/min for ozonizer, a heater is set to 800° C., and the analyzer is stood for about 3 hours for stabilization. After stabilizing the analyzer, a calibration curve of calibration curve ranges of 5 ppm, 10 ppm, 50 ppm, 100 ppm and 500 ppm is made using Nitrogen standard (AccuStandard S-22750-01-5 ml), and an area corresponding to each concentration is obtained. Then, by using the ratios of concentrations to areas, a straight line is made. After that, a ceramic boat holding 20 mg of a specimen is put in the auto sampler of the analyzer and measurement is conducted to obtain an area. By using the area of the specimen thus obtained and the calibration curve, the N content is calculated. In this case, the specimen is a modified conjugated diene-based polymer from which solvents are removed by putting the specimen in hot water heated by steam and stirring, and may be a specimen from which remaining monomers, remaining modifiers and oil are removed.

In the present disclosure, the "Si content" is measured using an inductively coupled plasma optical emission spectroscopy (ICP-OES; Optima 7300DV) as an ICP analysis method. Particularly, measurement is performed by adding about 0.7 g of a specimen to a platinum (Pt) crucible, adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:
1) step 1: initial temp 0° C., rate (temp/hr) 180° C./hr, temp (holdtime) 180° C. (1 hr),
2) step 2: initial temp 180° C., rate (temp/hr) 85° C./hr, temp (holdtime) 370° C. (2 hr), and
3) step 3: initial temp 370° C., rate (temp/hr) 47° C./hr, temp (holdtime) 510° C. (3 hr),
adding 1 mL of concentrated nitric acid (48 wt %) and 20 µl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 ml of ultrapure water, and performing incineration.

Modified Conjugated Diene-Based Polymer

The present invention provides a modified conjugated diene-based polymer having excellent affinity with a filler, and as a result, capable of providing a rubber composition having excellent processability, tensile properties and viscoelasticity properties.

The modified conjugated diene-based polymer according to an embodiment of the present invention includes a first chain including a repeating unit derived from a conjugated diene-based monomer; a second chain including a repeating unit derived from a compound represented by the following Formula 1; and a derived unit from an amine-containing alkoxysilane-based modifier, wherein the first chain and the second chain are coupled by the derived unit of the modifier:

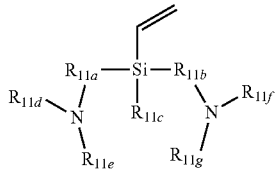

[Formula 1]

in Formula 1, $R_{11a}$ and $R_{11b}$ are each independently a single bond or a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, wherein the substituent is an alkyl group of 1 to 10 carbon atoms, a cycloalkyl group of 5 to 10 carbon atoms, or an aryl group of 6 to 20 carbon atoms, $R_{11c}$ is an alkyl group of 1 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; or a heterocyclic group of 3 to 20 carbon atoms, and $R_{11d}$ to $R_{11g}$ are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a mono-substituted, di-substituted or tri-substituted alkylsilyl group with alkyl groups of 1 to 10 carbon atoms.

The modified conjugated diene-based polymer according to an embodiment of the present invention may be prepared by a preparation method, which will be explained later, including a step of reacting a macromonomer including a repeating unit derived from the compound represented by Formula 1 with a modified active first chain after modification reaction, and through this, may have a structure like a graft copolymer including the first chain including a repeating unit derived from a conjugated diene-based monomer, and a second chain derived from the macromonomer which is bonded to a derived unit from a modifier containing an amine-containing alkoxysilane-based modifier, which is bonded to at least one terminal of the first chain. That is, in the modified conjugated diene-based polymer, the first chain and the second chain may be coupled by the derived unit from a modifier.

The modified conjugated diene-based polymer according to an embodiment of the present invention may be prepared by a preparation method, which will be explained later, including a step of reacting a macromonomer including a repeating unit derived from the compound represented by Formula 1 with a modified first chain having activity after modification reaction, and through this, may have a structure like a graft copolymer including the first chain including a repeating unit derived from a conjugated diene-based monomer, and a second chain derived from the macromonomer which is bonded to a derived unit from a modifier containing an amine-containing alkoxysilane-based, which is bonded to at least one terminal of the first chain. That is, in the modified conjugated diene-based polymer, the first chain and the second chain may be coupled by the derived unit from a modifier.

As described above, if all functional groups are intensively distributed at one terminal of the modified conjugated diene-based polymer and make interaction with silica, only one terminal of the polymer may be coupled with silica, and the other terminal may be a free state, and accordingly, similar to the conventional modified polymer at a single terminal, effects on the dispersibility of a filler and the prevention of flocculation may be excellent, and processability may be markedly improved. In addition, at one terminal coupled with a functional group, the second chain derived from a macromonomer and the derived unit from a modifier are included, and effects by the interaction with a filler may be achieved to the equal or better level as the conventional modified polymer at both terminals, and thus, tensile properties and viscoelasticity properties may become excellent.

In addition, generally, a residual group derived from a modifier, for example, an alkoxy group (—OR, where R is a hydrocarbon group) or a hydroxyl group (—OH) is present in a modified conjugated diene-based polymer, and as time goes by, condensation reaction, hydrolysis reaction, etc. may arise from the residual group, and storage stability may be deteriorated, mooney viscosity may increase, molecular weight distribution may increase, and the excellence of the compounding properties of the modified conjugated diene-based polymer may not be maintained, and thus, if used in a rubber composition, there are problems in not achieving desired properties. However, since the modified conjugated diene-based polymer according to an embodiment of the present invention is prepared by a preparation method, which will be explained later, a structure in which the second chain derived from a macromonomer is bonded to an alkoxy group which is a residual group derived from a modifier present in a polymer may be obtained, and as a result, the residual group derived from a modifier may not be present in the polymer or may be reduced in contrast to the conventional preparation method.

In addition, the modified conjugated diene-based polymer according to an embodiment of the present invention is prepared by the preparation method, which will be explained later, and may have advantages of introducing more functional groups than a case of using only a modifier having lots of functional groups. Particularly, in view of the active polymer and the alkoxy group of the modifier, the coupling of one molecule of the modifier with two or more polymer chains is difficult due to the steric hindrance of the polymer, and though three or more chains may be coupled, a modified polymer in which three or more chains are coupled must be a little. However, according to the preparation method of the present invention, irrespective of the steric hindrance, to the alkoxy residual group of the modifier which is coupled with the polymer chain, the second chain derived from a macromonomer may be coupled, and more functional groups may be introduced into the polymer chain.

That is, there are limitations in introducing functional groups in one molecule of the modifier, and though no matter how many functional groups are introduced, there is difference in the absolute amount of the functional group when compared with a case of coupling a chain including a functional group with an alkoxy residual group without any influence by steric hindrance as in the present invention.

Accordingly, the modified conjugated diene-based polymer according to the present invention has excellent storage stability as time goes by and may maintain excellent compounding properties constantly at the initiation of preparation or after the passage of time, and may have excellent tensile properties and viscoelasticity properties in contrast to the conventional modified polymer at a single terminal.

First Chain Including Repeating Unit Derived from Conjugated Diene-Based Monomer According to an embodiment of the present invention, the first chain which is the main skeleton of the modified conjugated diene-based polymer includes a repeating unit derived from a conjugated diene-based monomer, and the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom).

In addition, the first chain may further include a repeating unit derived from an aromatic vinyl-based monomer, and the aromatic vinyl-based monomer may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, 1-vinyl-5-hexylnaphthalene, 3-(2-pyrrolidino ethyl) styrene, 4-(2-pyrrolidino ethyl)styrene and 3-(2-pyrrolidino-1-methyl ethyl)-α-methylstyrene.

In another embodiment, the first chain of the modified conjugated diene-based polymer may be a copolymer further including a repeating unit derived from a diene-based monomer of 1 to 10 carbon atoms together with the repeating unit derived from the conjugated diene-based monomer. The repeating unit derived from the diene-based monomer may be a repeating unit derived from a diene-based monomer which is different from the conjugated diene-based monomer, and the diene-based monomer which is different from the conjugated diene-based monomer may be, for example, 1,2-butadiene. If the modified conjugated diene-based polymer is a copolymer further including a diene-based monomer, the modified conjugated diene-based polymer may include the repeating unit derived from the diene-based monomer in an amount of greater than 0 wt % to 1 wt %, greater than 0 wt % to 0.1 wt %, greater than 0 wt % to 0.01 wt %, or greater than 0 wt % to 0.001 wt %, and within this range, effects of preventing gel formation may be achieved.

According to an embodiment of the present invention, if repeating units derived from two or more monomers are included in the first chain which forms the skeleton of the modified conjugated diene-based polymer, the first chain may be a random copolymer chain, and in this case, effects of excellent balance between physical properties may be achieved. The random copolymer may mean the arrangement of repeating units forming a copolymer in disorder.

Second Chain Including Repeating Unit Derived from Compound Represented by Formula 1

In addition, the modified conjugated diene-based polymer according to an embodiment of the present invention further includes a second chain in addition to the first chain, and the second chain is derived from a macromonomer including a repeating unit derived from the compound represented by Formula 1, and the main unit may be the repeating unit derived from the compound represented by Formula 1.

Particularly, in Formula 1, $R_{11a}$ and $R_{11b}$ are each independently a single bond or an unsubstituted alkylene group of 1 to 10 carbon atoms, $R_{11c}$ is an alkyl group of 1 to carbon atoms, and $R_{11d}$ to $R_{11g}$ are each independently an alkyl group of 1 to 10 carbon atoms; or a mono-substituted, di-substituted or tri-substituted alkylsilyl group with alkyl groups of 1 to 10 carbon atoms.

In another embodiment, in Formula 1, $R_{11a}$ and $R_{11b}$ are each independently a single bond or an unsubstituted alkylene group of 1 to 6 carbon atoms, $R_{11c}$ is an alkyl group of 1 to 6 carbon atoms, and $R_{11d}$ to $R_{11g}$ are each independently an alkyl group of 1 to 6 carbon atoms; or a tri-substituted trialkylsilyl group with alkyl groups of 1 to 6 carbon atoms.

More particularly, the compound represented by Formula 1 may be one or more selected from the compounds represented by Formula 1-1 to 1-3 below.

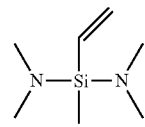

[Formula 1-1]

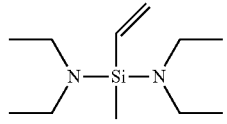

[Formula 1-2]

[Formula 1-3]

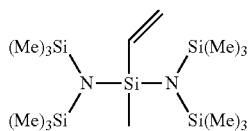

In Formula 1-3, Me is a methyl group.

Modifier

In addition, the modified conjugated diene-based polymer may have a coupled type of the first chain and the second chain by the derived unit from an alkoxysilane-based monomer, and the second chain may be coupled with the modifier as a hub.

According to an embodiment of the present invention, the modifier may be a modifier having affinity with silica. The modifier having affinity with silica may mean a modifier containing a functional group having affinity with silica in a compound used as a modifier, and the functional group having affinity with silica may mean a functional group having excellent affinity with a filler, particularly, a silica-based filler, and is capable of making interaction between the silica-based filler and the functional group derived from the modifier.

In addition, the alkoxysilane-based modifier according to the present invention may be an amine-containing alkoxysilane-based modifier or a non-amine-containing alkoxysilane-based modifier.

Particularly, according to an embodiment of the present invention, the amine-containing alkoxysilane-based modifier may be a compound represented by Formula 2 below.

[Formula 2]

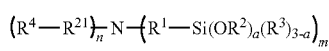

In Formula 2, $R^1$ may be a single bond, or an alkylene group of 1 to 10 carbon atoms, $R^2$ and $R^3$ may be each independently an alkyl group of 1 to 10 carbon atoms, $R^4$ may be hydrogen, an epoxy group, an alkyl group of 1 to 10 carbon atoms, an allyl group of 2 to 10 carbon atoms, a mono-substituted, di-substituted or tri-substituted alkylsilyl group with alkyl groups of 1 to 10 carbon atoms, or a heterocyclic group of 2 to 10 carbon atoms, $R^{21}$ may be a single bond, an alkylene group of 1 to 10 carbon atoms, or $-[R^{42}O]_j-$, where $R^{42}$ may be an alkylene group of 1 to 10 carbon atoms, a and m may be each independently an integer selected from 1 to 3, n may be an integer of 0 to 2, and j may be an integer selected from 1 to 30.

In a particular embodiment, the compound represented by Formula 2 may be one selected from the group consisting of N,N-bis(3-(dimethoxy(methyl)silyl)propyl)-methyl-1-amine, N,N-bis(3-(diethoxy(methyl)silyl)propyl)-methyl-1-amine, N,N-bis(3-(trimethoxysilyl)propyl)-methyl-1-amine, N,N-bis(3-(triethoxysilyl)propyl)-methyl-1-amine, tri(trimethoxysilyl)amine, tri(3-(trimethoxysilyl)propyl)amine, N,N-bis(3-(diethoxy(methyl)silyl)propyl)-1,1,1-trimethlysilanamine, N-(3-(1H-1,2,4-triazole-1-yl)propyl)-3-(trimethoxysilyl)-N-(3-(trimethoxysilyl)propyl)propan-1-amine, 3-(trimethoxysilyl)-N-(3-(trimethoxysilyl)propyl)-N-(3-(1-(3-(trimehtoxysilyl)propyl)-1H-1,2,4-triazol-3-yl)propyl)propan-1-amine, N-allyl-N-(3-(trimethoxysilyl)propyl)prop-2-en-1-amine), N,N-bis(oxiran-2-ylmethyl)-3-(trimethoxysilyl)propan-1-amine, 1,1,1-trimethyl-N-(3-(triethoxysilyl)propyl)-N-(trimethylsilyl)silanamine) and N,N-bis(3-(triethoxysilyl)propyl)-2,5,8,11,14-pentaoxa-hexadecan-16-amine.

In another embodiment, the compound represented by Formula 2 may be one or more selected from the compounds represented by Formula 2-1 to Formula 2-6 below.

[Formula 2-1]

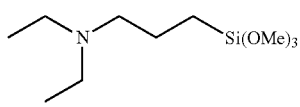

[Formula 2-2]

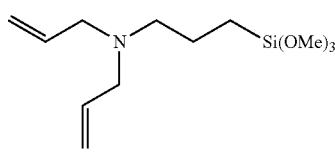

[Formula 2-3]

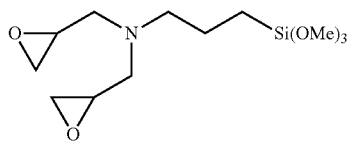

[Formula 2-4]

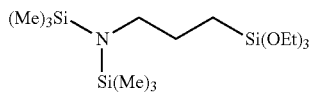

[Formula 2-5]

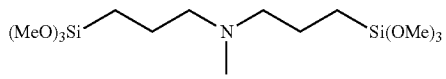

[Formula 2-6]

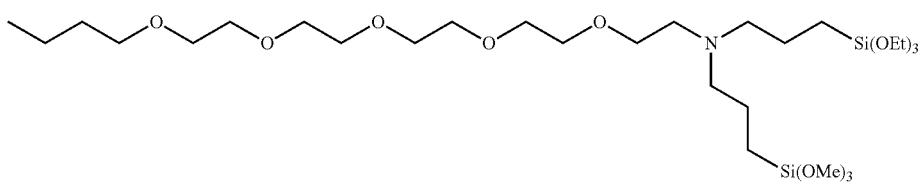

In Formula 2-1 to Formula 2-6, Me is a methyl group, and Et is an ethyl group.

In another embodiment, the amine-containing alkoxysilane-based modifier may be a compound represented by Formula 3 below.

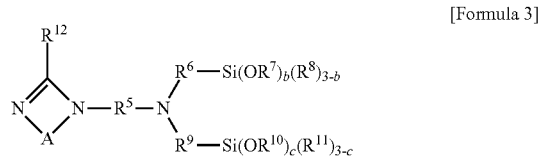

[Formula 3]

In Formula 3, $R^5$, $R^6$ and $R^9$ may be each independently an alkylene group of 1 to 10 carbon atoms, $R^7$, $R^8$, $R^{10}$ and $R^{11}$ may be each independently an alkyl group of 1 to 10 carbon atoms, $R^{12}$ may be hydrogen or an alkyl group of 1 to 10 carbon atoms, b and c may be each independently 1, 2 or 3, where b+c≥4 may be satisfied, and A may be

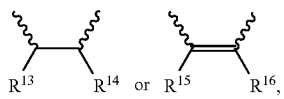

where $R^{13}$, $R^{14}$, $R^{15}$ and $R^{16}$ may be each independently hydrogen or an alkyl group of 1 to 10 carbon atoms.

In a particular embodiment, the compound represented by Formula 3 may be one selected from the group consisting of N-(3-(1H-imidazol-1-yl)propyl)-3-(triethoxysilyl)-N-(3-(triethoxysilyl)propyl)propan-1-amine and 3-(4,5-dihydro-1H-imidazol-1-yl)-N,N-bis(3-(triethoxysilyl)propyl)propan-1-amine.

In another embodiment, the amine-containing alkoxysilane-based modifier may be a compound represented by Formula 4 below.

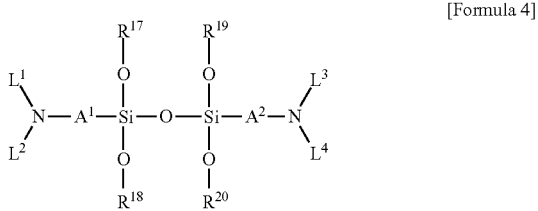

[Formula 4]

In Formula 4, $A^1$ and $A^2$ may be each independently a divalent hydrocarbon group of 1 to 20 carbon atoms, which contains an oxygen atom or not, $R^{17}$ to $R^{20}$ may be each independently a monovalent hydrocarbon group of 1 to 20 carbon atoms, $L^1$ to $L^4$ may be each independently a monosubstituted, di-substituted or tri-substituted alkylsilyl group with alkyl groups of 1 to 10 carbon atoms, or a monovalent hydrocarbon group of 1 to 20 carbon atoms, wherein $L^1$ and $L^2$, and $L^3$ and $L^4$ may be combined with each other to form a ring 1 to 5 carbon atoms, and if $L^1$ and $L^2$, and $L^3$ and $L^4$ are combined with each other to form a ring, the ring thus formed may include 1 to 3 heteroatoms which is one or more selected from the group consisting of N, O and S.

In a particular embodiment, the compound represented by Formula 4 may be one selected from the group consisting of 3,3'-(1,1,3,3-tetramethoxydisiloxane-1,3-diyl)bis(N,N-dimethylpropan-1-amine, 3,3'-(1,1,3,3-tetraethoxydisiloxane-1,3-diyl)bis(N,N-dimethylpropan-1-amine), 3,3'-(1,1,3,3-tetrapropoxydisiloxane-1,3-diyl)bis(N,N-dimethylpropan-1-amine), 3,3'-(1,1,3,3-tetramethoxydisiloxane-1,3-diyl)bis(N,N-diethylpropan-1-amine), 3,3'-(1,1,3,3-tetramethoxydisiloxane-1,3-diyl)bis(N,N-dipropylpropan-1-amine), 3,3'-(1,1,3,3-tetraethoxydisiloxane-1,3-diyl)bis(N,N-diethylpropan-1-amine), 3,3'-(1,1,3,3-tetrapropoxydisiloxane-1,3-diyl)bis(N,N-diethylpropan-1-amine), 3,3'-(1,1,3,3-tetraethoxydisiloxane-1,3-diyl)bis(N,N-dipropylpropan-1-amine), 3,3'-(1,1,3,3-tetrapropoxydisiloxane-1,3-diyl)bis(N,N-dipropylpropan-1-amine), 3,3'-(1,1,3,3-tetramethoxydisiloxane-1,3-diyl)bis(N,N-diethylmethan-1-amine), 3,3'-(1,1,3,3-tetraethoxydisiloxane-1,3-diyl)bis(N,N-diethylmethan-1-amine), 3,3'-(1,1,3,3-tetrapropoxydisiloxane-1,3-diyl)bis(N,N-diethylmethan-1-amine), 3,3'-(1,1,3,3-tetramethoxydisiloxane-1,3-diyl)bis(N,N-dimethylmethan-1-amine), 3,3'-(1,1,3,3-tetramethoxydisiloxane-1,3-diyl)bis(N,N-dipropylmethan-1-amine), 3,3'-(1,1,3,3-tetrapropoxydisiloxane-1,3-diyl)bis(N,N-dimethylmethan-1-amine), 3,3'-(1,1,3,3-tetrapropoxydisiloxane-1,3-diyl)bis(N,N-dipropylmethan-1-amine), 3,3'-(1,1,3,3-tetraethoxydisiloxane-1,3-diyl)bis(N,N-dimethylmethan-1-amine), 3,3'-(1,1,3,3-tetraethoxydisiloxane-1,3-diyl)bis(N,N-dipropylmethan-1-amine), N,N'-((1,1,3,3-tetramethoxydisiloxane-1,3-diyl)bis(propan-3,1-diyl)bis(1,1,1-trimethyl-N-(trimethylsilyl)silanamine), N,N'-((1,1,3,3-tetraethoxydisiloxane-1,3-diyl)bis(propan-3,1-diyl))bis(1,1,1-trimethyl-N-(trimethylsilyl)silanamine), N,N'-((1,1,3,3-tetrapropoxydisiloxane-1,3-diyl)bis(propan-3,1-diyl))bis(1,1,1-trimethyl-N-(trimethylsilyl)silanamine), N,N'-((1,1,3,3-tetramethoxydisiloxane-1,3-diyl)bis(propan-3,1-diyl))bis(1,1,1-trimethyl-N-phenylsilanamine), N,N'-((1,1,3,3-tetraethoxydisiloxane-1,3-diyl)bis(propan-3,1-diyl))bis(1,1,1-trimethyl-N-phenylsilanamine), N,N'-((1,1,3,3-tetrapropoxydisiloxane-1,3-diyl)bis(propan-3,1-diyl))bis(1,1,1-trimethyl-N-phenylsilanamine), 1,3-bis(3-(1H-imidazol-1-yl)propyl)-1,1,3,3-tetramethoxydisiloxane, 1,3-bis(3-(1H-imidazol-1-yl)propyl)-1,1,3,3-tetraethoxydisiloxane, and 1,3-bis(3-(1H-imidazol-1-yl)propyl)-1,1,3,3-tetrapropoxydisiloxane.

More particularly, the compound represented by Formula 4 may be a compound represented by Formula 4-1 below.

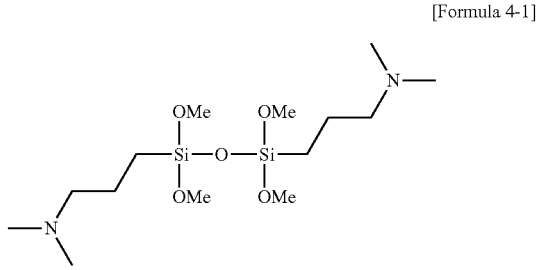

[Formula 4-1]

In Formula 4-1, Me is a methyl group.

In another embodiment, the amine-containing alkoxysilane-based modifier may be a compound represented by Formula 5 below.

[Formula 5]

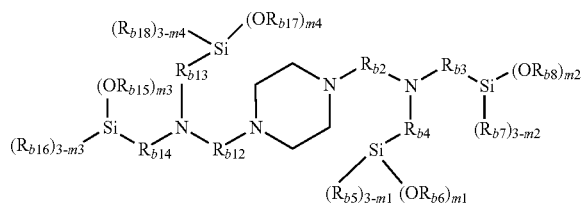

In Formula 5, $R_{b2}$ to $R_{b4}$ are each independently an alkylene group of 1 to 10 carbon atoms, $R_{b5}$ to $R_{b8}$ are each independently an alkyl group of 1 to 10 carbon atoms, $R_{b13}$ and $R_{b14}$ are each independently an alkylene group of 1 to 10 carbon atoms, $R_{b15}$ to $R_{b18}$ are each independently an alkyl group of 1 to 10 carbon atoms, and m1, m2, m3 and m4 are each independently an integer of 1 to 3.

Particularly, the compound represented by Formula 5 may be a compound represented by Formula 5-1 below.

[Formula 5-1]

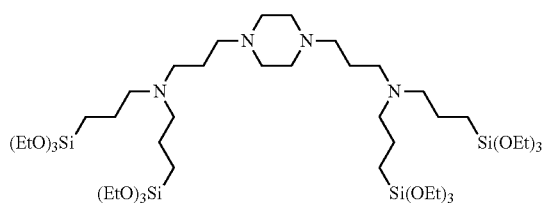

In Formula 5-1, Et is an ethyl group.

In another embodiment, the amine-containing alkoxysilane-based modifier may be a compound represented by Formula 6 below.

[Formula 6]

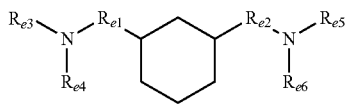

In Formula 6, $R_{e1}$ and $R_{e2}$ are each independently an alkylene group of 1 to 10 carbon atoms, $R_{e3}$ to $R_{e6}$ are each independently hydrogen, an alkyl group of 1 to 10 carbon atoms or $-R_{e7}SiR_{e8}R_{e9}R_{e10}$, where at least one among $R_{e3}$ to $R_{e6}$ is $-R_{e7}SiR_{e8}R_{e9}R_{e10}$, wherein $R_{e7}$ is a single bond or an alkylene group of 1 to 10 carbon atoms, $R_{e8}$ to $R_{e10}$ are each independently an alkyl group of 1 to 10 carbon atoms or an alkoxy group of 1 to 10 carbon atoms, where at least one among $R_{e8}$ to $R_{e10}$ is an alkoxy group of 1 to 10 carbon atoms.

Particularly, the compound represented by Formula 6 may be a compound represented by Formula 6-1 below.

[Formula 6-1]

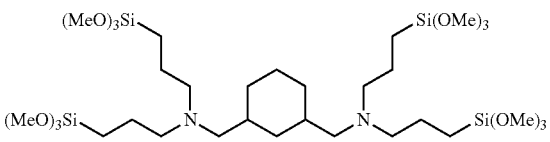

In Formula 6-1, Me is a methyl group.

In another embodiment, the amine-containing alkoxysilane-based modifier may be a compound represented by Formula 7 below.

[Formula 7]

In Formula 7, $R_{h1}$ and $R_{h2}$ are each independently an alkyl group of 1 to 10 carbon atoms or an alkoxy group of 1 to 10 carbon atoms, $R_{h3}$ is a single bond or an alkylene group of 1 to 10 carbon atoms, and $A_3$ is $-Si(R_{h4}R_{h5}R_{h6})$ or $-N[Si(R_{h7}R_{h8}R_{h9})]_2$, where $R_{h4}$ to $R_{h9}$ are each independently an alkyl group of 1 to 10 carbon atoms or an alkoxy group of 1 to 10 carbon atoms.

Particularly, the compound represented by Formula 7 may be a compound represented by Formula 7-1 or Formula 7-2 below.

[Formula 7-1]

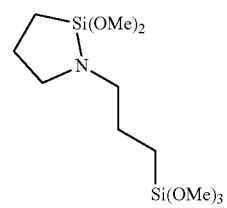

[Formula 7-2]

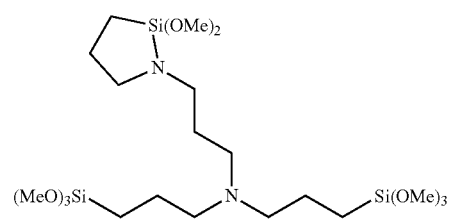

In Formulae 7-1 and 7-2, Me is a methyl group.

In another embodiment, the non-amine-containing alkoxysilane-based modifier may be a compound represented by Formula 8 below.

[Formula 8]

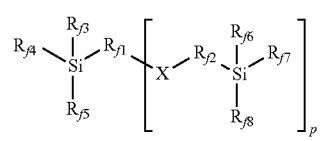

In Formula 8, X is O or S, $R_{f1}$ and $R_{f2}$ are each independently a single bond or an alkylene group of 1 to 10 carbon atoms, $R_{f3}$ to $R_{f8}$ are each independently hydrogen, an alkyl group of 1 to 10 carbon atoms, an alkoxy group of 1 to 10 carbon atoms, an aryl group of 6 to 10 carbon atoms, a cycloalkyl group of 5 to 10 carbon atoms or an aralkyl group of 7 to 14 carbon atoms, and p is an integer of 0 or 1, where if p is 0, $R_{f1}$ is an alkyl group of 1 to 10 carbon atoms or an alkoxy group of 1 to 10 carbon atoms.

Particularly, the compound represented by Formula 9 may be a compound represented by Formula 9-1 or Formula 9-2 below.

[Formula 9-1]

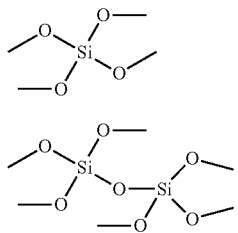

[Formula 9-2]

In another embodiment, the non-amine-containing alkoxysilane-based modifier may be a compound represented by Formula 10 below.

[Formula 10]

In Formula 10, $R_{g1}$ to $R_{g4}$ are each independently hydrogen, an alkyl group of 1 to 10 carbon atoms, an alkoxy group of 1 to 10 carbon atoms, an aryl group of 6 to 12 carbon atoms or —$R_{g5}Si(OR_{g6})_r(R_{g7})_{3-r}$, where at least one among $R_{g1}$ to $R_{g4}$ is —$R_{g5}Si(OR_{g6})_r(R_{g7})_{3-r}$, wherein $R_{g5}$ is a single bond or an alkylene group of 1 to 10 carbon atoms, $R_{g6}$ and $R_{g7}$ are each independently an alkyl group of 1 to 10 carbon atoms, r is 1 to 3, and Y is C or N, where if Y is N, $R_{g4}$ is not present.

Particularly, the compound represented by Formula 10 may be a compound represented by Formula 10-1 below.

[Formula 10-1]

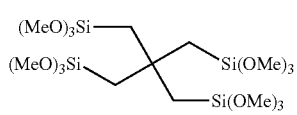

In Formula 10-1, Me is a methyl group.

In another embodiment, the non-amine-containing alkoxysilane-based modifier may be a compound represented by Formula 11 below.

[Formula 11]

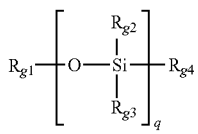

In Formula 11, $R_{g1}$ to $R_{g3}$ are each independently an alkyl group of 1 to 10 carbon atoms or an alkoxy group of 1 to 10 carbon atoms, $R_{g4}$ is an alkoxy group of 1 to 10 carbon atoms, and q is an integer of 2 to 100.

Particularly, in Formula 11, $R_{g1}$ to $R_{g3}$ are each independently an alkyl group of 1 to 6 carbon atoms or an alkoxy group of 1 to 6 carbon atoms, $R_{g4}$ is an alkoxy group of 1 to 6 carbon atoms, and q is an integer of 2 to 50.

Main Parameter of Modified Conjugated Diene-Based Polymer

In addition, the modified conjugated diene-based polymer according to an embodiment of the present invention may have the N content in a polymer of 150 ppm or more based on a weight according to NSX analysis and may have the Si content in a polymer of 180 ppm or more based on a weight according to ICP analysis.

Particularly, the modified conjugated diene-based polymer may have the Si content in a polymer based on a weight according to ICP analysis of 180 ppm or more, preferably, 190 ppm or more, more preferably, 200 ppm or more.

The Si content may be derived from the modifier, derived from the compound represented by Formula 1 and the modifier in some cases, and the Si content is may be a functional group present in a modified conjugated diene-based polymer, i.e., a main factor expected to improve the affinity with a filler, while improving processability.

According to an embodiment of the present invention, the modified conjugated diene-based polymer has the N content in a polymer according to NSX analysis of 150 ppm or more, preferably, 160 ppm or more, more preferably, 170 ppm or more. The modified conjugated diene-based polymer may have the relatively high content of N atoms by the preparation method of serving the repeated presence of the functional group derived from the compound represented by Formula 1, for example, amine group, and may have a structure in which the functional group derived from the compound represented by Formula 1 is coupled with a polymer first chain through a derived unit from a modifier which is bonded to at least one terminal of the first chain, thereby markedly improving the affinity with a filler, for example, silica and dispersibility during a compounding process and achieving excellent viscoelasticity properties and at the same time, markedly improved processability.

In addition, due to such high content of N atoms, the modified conjugated diene-based polymer according to an embodiment of the present invention may have the molar ratio (N/Si) of N atoms and Si atoms of 0.75 or more. Generally, a polymer modified by a modifier may include an Si atom and an N atom due to a modification polymerization initiator, a modified monomer, etc., but as described above, since the polymer according to an embodiment of the present invention includes the repeating unit derived from the compound represented by Formula 1, the N content may be relatively large, and as consequent symbolic meaning, the molar ratio of the N atom and the Si atom may be 0.75 or more, preferably, 0.77 or more, or 0.78 or more, more preferably, 0.8 or more, most optically, 0.9 or more. Through this, the processability improving effects according to the improvement of dispersibility during compounding may be optimized.

Also, according to an embodiment of the present invention, the modified conjugated diene-based polymer may have the change ratio of a mooney viscosity ($MV_R$) according to Mathematical Formula 1 of 20% or less.

$$MV_R = [(MV_f - MV_i)/MV_i] \times 100 \qquad \text{[Mathematical Formula 1]}$$

In Mathematical Formula 1, $MV_R$ is the change ratio of mooney viscosity, $MV_f$ is a mooney viscosity at 100° C. after standing the polymer at 25° C. for 30 days, and $MV_i$ is an initial mooney viscosity at 100° C. of the polymer.

The change ratio of a mooney viscosity may be an index of noticing that the increase of the mooney viscosity generated during storage after preparation as well as processability, and the polymer according to the present invention may have improved processability, furthermore, excellent storage stability due to a low change ratio of a mooney viscosity even though storing for a long time, due to the structural characteristics with specific bonding structure of the second chain including the repeating unit derived from the compound represented by Formula 1, a derived unit from a modifier and the first chain of the polymer.

The change ratio of a mooney viscosity is the change ratio between the initial mooney viscosity of a polymer and the mooney viscosity of the polymer after storing for 30 days at room temperature, and in the present invention, a polymer with 20% or less, preferably, 15% or less is provided. Here, the mooney viscosity is a mooney viscosity at 100° C., and may be measured by a common method applied in this technical field.

General Details

In another embodiment, the modified conjugated diene-based polymer according to an embodiment of the present invention may have a number average molecular weight (Mn) of 1,000 g/mol to 2,000,000 g/mol, 10,000 g/mol to 1,000,000 g/mol, or 100,000 g/mol to 800,000 g/mol, a weight average molecular weight (Mw) of 1,000 g/mol to 3,000,000 g/mol, 10,000 g/mol to 2,000,000 g/mol, or 100,000 g/mol to 2,000,000 g/mol, and a peak average molecular weight (Mp) of 1,000 g/mol to 3,000,000 g/mol, 10,000 g/mol to 2,000,000 g/mol, or 100,000 g/mol to 2,000,000 g/mol. Within the ranges, excellent effects of rotation resistance and wet skid resistance may be achieved. In another embodiment, the modified conjugated diene-based polymer may have molecular weight distribution (PDI; MWD; Mw/Mn) of 1.0 to 3.0, or 1.1 to 2.5, or 1.1 to 2.0, and within this range, excellent effects of tensile properties, viscoelasticity properties, and balance between physical properties may be achieved.

Also, the modified conjugated diene-based polymer may have a mooney viscosity at 100° C. of 30 or more, 40 to 150, or to 140, and within this range, excellent effects of processability and productivity may be achieved.

Here, the mooney viscosity may be measured using a mooney viscometer. Particularly, the mooney viscosity may be measured by using MV-2000E of Monsanto Co. using Large Rotor at a rotor speed of 2±0.02 rpm at 100° C. In this case, a polymer was stood at room temperature (23±3° C.) for 30 minutes or more, and 27±3 g of the polymer was collected and put in a die cavity, and then, Platen was operated while applying torque for measurement.

In addition, the vinyl content of the modified conjugated diene-based polymer may be 5 wt % or more, 10 wt % or more, or 10 wt % to 60 wt %. Here, the vinyl content may mean the amount of not 1,4-added but 1,2-added conjugated diene-based monomer with respect to 100 wt % of a conjugated diene-based copolymer composed of a monomer having a vinyl group and an aromatic vinyl-based monomer.

Method for Preparing Modified Conjugated Diene-Based Polymer

In addition, the present invention provides a method for preparing a modified conjugated diene-based polymer.

The method for preparing the modified conjugated diene-based polymer according to an embodiment of the present invention is characterized in including polymerizing a conjugated diene-based monomer, or a conjugated diene-based monomer and an aromatic vinyl-based monomer in the presence of a polymerization initiator in a hydrocarbon solvent to prepare an active first chain (S1); reacting the active first chain with an alkoxysilane-based modifier to prepare a modified active first chain (S2); and reacting the modified active first chain and a macromonomer including a repeating unit derived from a compound represented by Formula 1 (S3) below.

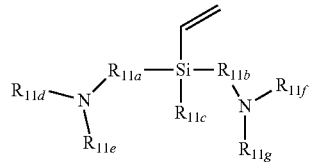

[Formula 1]

In Formula 1, $R_{11a}$ to $R_{11c}$ are the same as described above.

In addition, the modifier, the conjugated diene-based monomer and the aromatic vinyl-based monomer are the same as described above.

The hydrocarbon solvent is not specifically limited, but may be, for example, one or more selected from the group consisting of n-pentane, n-hexane, n-heptane, isooctane, cyclohexane, toluene, benzene and xylene.

The polymerization initiator is not specifically limited, but may be, for example, one or more selected from the group consisting of methyllithium, ethyllithium, propyllithium, isopropyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

According to an embodiment of the present invention, the polymerization initiator may be used in 0.01 mmol to 10 mmol, 0.05 mmol to 5 mmol, 0.1 mmol to 2 mmol, 0.1 mmol to 1 mmol, or 0.15 to 0.8 mmol based on total 100 g of the monomer. Here, 100 g of the monomer may represent the total amount of the conjugated diene-based monomer, or the conjugated diene-based monomer and the aromatic vinyl-based monomer.

S1 Step

The polymerization of step (S1) may be, for example, an anionic polymerization, and particularly, a living anionic polymerization by which an anionic active part is included at the polymerization terminal through a propagation polymerization reaction by anions. In addition, the polymerization of step (S1) may be a polymerization with heating, an isothermal polymerization, or a polymerization at a constant temperature (adiabatic polymerization). Here, the polymerization at a constant temperature means a polymerization method including a step of polymerizing using self-generated heat of reaction without optionally applying heat after adding a polymerization initiator, and the polymerization with heating means a polymerization method including injecting the polymerization initiator and then, increasing the temperature by optionally applying heat. The isothermal polymerization means a polymerization method by which the temperature of a polymer is kept constant by increasing heat by applying heat or taking heat after adding the polymerization initiator.

In addition, according to an embodiment of the present invention, the polymerization of step (S1) may be performed by further adding a diene-based compound of 1 to 10 carbon atoms in addition to the conjugated diene-based monomer, and in this case, effects of preventing the formation of gel on the wall of a reactor during operation for a long time may be achieved. The diene-based compound may be, for example, 1,2-butadiene.

The polymerization of step (S₁) may be performed in a temperature range of, for example, 80° C. or less, −20° C. to 80° C., 0° C. to 80° C., 0° C. to 70° C., or 10° C. to 70° C., and within the range, the molecular weight distribution of a polymer is controlled narrow, and the improving effects of physical properties were excellent.

The active polymer chain prepared by step (S1) may mean a polymer in which a polymer anion and an organometallic cation are coupled.

Meanwhile, the polymerization of step (S1) may be performed by including a polar additive, and the polar additive may be added in a ratio of 0.001 g to 50 g, 0.001 g to 10 g or 0.005 g to 0.1 g based on total 100 g of the monomer. In another embodiment, the polar additive may be added in a ratio of 0.001 g to 10 g, 0.005 g to 5 g, 0.005 g to 4 g based on total 1 mmol of the polymerization initiator.

The polar additive may be, for example, one or more selected from the group consisting of tetrahydrofuran, 2,2-di(2-tetrahydrofuryl)propane, diethyl ether, cyclopentyl ether, dipropyl ether, ethylene methyl ether, ethylene dimethyl ether, diethyl glycol, dimethyl ether, tert-butoxy ethoxy ethane, bis(3-dimethylaminoethyl)ether, (dimethylaminoethyl) ethyl ether, trimethylamine, triethylamine, tripropylamine, N,N,N',N'-tetramethylethylenediamine, sodium mentholate and 2-ethyl tetrahydrofufuryl ether, preferably, 2,2-di(2-tetrahydrofuryl) propane, triethylamine, tetramethylethylenediamine, sodium mentholate or 2-ethyl tetrahydrofufuryl ether. If the polar additive is included, and if a conjugated diene-based monomer and an aromatic vinyl-based monomer are copolymerized, the difference of their reaction rates may be compensated, and effects of inducing easy formation of a random copolymer may be achieved.

S2 Step

The (S2) step is a step of reacting the active first chain with a modifier to prepare a modified active first chain, and here, the reaction may be modification or coupling reaction, and in this case, the modifier may be used in an amount of 0.01 mmol to 10 mmol based on total 100 g of the monomer. In another embodiment, the modifier may be used in a molar ratio of 1:0.1 to 10, 1:0.1 to 5, or 1:0.1 to 1:3, based on 1 mol of the polymerization initiator in step (S1).

S3 Step

In addition, the (S3) step is a step of reacting the active first chain with a macromonomer including the repeating unit derived from the compound represented by Formula 1 to prepare a modified conjugated diene-based polymer.

Meanwhile, the preparation method according to an embodiment of the present invention may further include a step of preparing a macromonomer prior to the (S3) step, and the step for preparing the macromonomer may be performed by performing polymerization reaction of the compound represented by Formula 1 or the compound represented by Formula 1 and a conjugated diene-based monomer in the presence of an organolithium compound in a hydrocarbon solvent. In this case, the polymerization reaction may be a living anionic polymerization to give an anionic active part at the polymerization terminal by the propagation polymerization reaction by anions, and the macromonomer may be a living anion terminal of which one terminal is capable of acting as a monomer.

Here, the organolithium compound may be an alkyllithium compound, and may particularly be methyllithium, ethyllithium, propyllithium, isopropyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, or 4-cyclopentyl lithium, more particularly, n-butyllithium.

In an embodiment, the macromonomer may be prepared through Reaction 1 below and may be a compound having a structure represented by Formula M below.

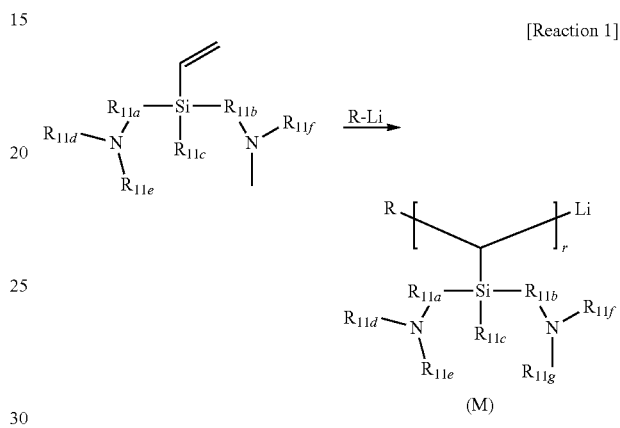

In Reaction 1, $R_{11a}$, to $R_{11g}$ are the same as defined in Formula 1, R—Li is an alkyllithium compound, and R is an alkyl group derived from the alkyllithium.

In addition, the macromonomer may include 1 to 80, 1 to 60, or 1 to 50 repeating units derived from the compound represented by Formula 1, and for example, in Formula M, r may be 1 to 80, 1 to 60, or 1 to 50. In this case, the processability, tensile properties and viscoelasticity properties of the modified conjugated diene-based polymer including the second chain derived from the macromonomer may be excellent in balance.

Meanwhile, the (S3) step may be for preparing a modified conjugated diene-based polymer by reacting the modified active polymer and the macromonomer, i.e., the functional group derived from a modifier in the modified active polymer and the living anion terminal of the macromonomer.

Particularly, the modified active polymer first chain prepared in the (S2) step includes the functional group derived from a modifier, and the functional group derived from the modifier includes an alkoxy group not reacted with a polymer chain but remaining, and accordingly, through the reaction of the living anion terminal of the macromonomer and the alkoxy group, the modified conjugated diene-based polymer may be prepared.

In addition, the macromonomer may be used in 0.1 to 4.0 mol, 0.1 to 2.0 mol, or 0.5 to 1.5 mol based on 1 mol of the polymerization initiator.

Meanwhile, as a conventional method for additionally introducing a functional group to a polymer, an active polymer has been modified with a modifier, and performing condensation reaction of reacting a compound capable of condensing with the Si—O bond of the modifier has been applied. However, if such condensation reaction is used, the bond between a material having an additional functional group and the modified active polymer is formed as —Si—O—Si—, and there are probability of arising hydrolysis during subsequent steam stripping step, washing step or storing, and accordingly, there are problems of separating the bond around a condensation bonding part, and at last, the losing a functional group.

On the contrary, in the modified conjugated diene-based polymer prepared by the preparation method according to the present invention, the living terminal of the macromonomer reacts with the Si—O—R group of the modifier to form a Si—C bond, and this bond is a bond not undergoing hydrolysis reaction like a condensed bond and is free from separation. Accordingly, there may be advantages in that storage stability is improved, and the generation of defects of losing an initially introduced functional group does not arise.

Rubber Composition

Also, the present invention provides a rubber composition including the modified conjugated diene-based polymer.

The rubber composition may include the modified conjugated diene-based polymer in an amount of 10 wt % or more, 10 wt % to 100 wt %, or 20 wt % to 90 wt %, and within this range, mechanical properties such as tensile strength and abrasion resistance are excellent, and effects of excellent balance between physical properties may be achieved.

In addition, the rubber composition may further include other rubber component, as necessary, in addition to the modified conjugated diene-based polymer, and in this case, the rubber component may be included in an amount of 90 wt % or less based on the total weight of the rubber composition. In a particular embodiment, the rubber component may be included in an amount of 1 part by weight to 900 parts by weight based on 100 parts by weight of the modified conjugated diene-based polymer.

The rubber component may be, for example, a natural rubber or a synthetic rubber, and may particularly be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, and a halogenated butyl rubber, and any one among them or mixtures of two or more thereof may be used.

The rubber composition may include a filler of 0.1 parts by weight to 200 parts by weight, or 10 parts by weight to 120 parts by weight based on 100 parts by weight of the modified conjugated diene-based polymer of the present invention. The filler may be, for example, a silica-based filler, particularly, wet silica (hydrated silicate), dry silica (anhydrous silicate), calcium silicate, aluminum silicate, or colloid silica. Preferably, the filler may be wet silica which has the most significant improving effect of destruction characteristics and compatible effect of wet grip. In addition, the rubber composition may further include a carbon-based filler, as necessary.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one among them or mixtures of two or more thereof may be used. Preferably, bis(3-triethoxysilylpropyl)polysulfide or 3-trimethoxysilylpropylbenzothiazyltetrasulfide may be used in consideration of the improving effect of reinforcing properties.

In addition, in the rubber composition according to an embodiment of the present invention, since a modified conjugated diene-based polymer in which a functional group having high affinity with silica is introduced into an active part is used as a rubber component, the compounding amount of the silane coupling agent may be smaller than a common case. Thus, the silane coupling agent may be used in an amount of 1 part by weight to 20 parts by weight, or 5 parts by weight to 15 parts by weight based on 100 parts by weight of silica. Within the above amount range, effects as a coupling agent may be sufficiently exhibited, and preventing effects of gelation of a rubber component may be achieved.

The rubber composition according to an embodiment of the present invention may be sulfur crosslinkable, and so may further include a vulcanizing agent. The vulcanizing agent may particularly be a sulfur powder and may be included in an amount of 0.1 parts by weight to 10 parts by weight based on 100 parts by weight of the rubber component. Within the above amount range, elasticity and strength required for a vulcanized rubber composition may be secured, and at the same time, an excellent low fuel consumption ratio may be achieved.

The rubber composition according to an embodiment of the present invention may further include various additives used in a common rubber industry in addition to the above components, particularly, a vulcanization accelerator, a process oil, an antioxidant, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of the vulcanized rubber may be prevented.

The antioxidant may include, for example, 2,6-di-t-butyl paracresol, dibutylhydroxytoluenyl, 2,6-bis((dodecylthio) methyl)-4-nonylphenol or 2-methyl-4,6-bis((octylthio) methyl)phenol, and may be used in an amount of 0.1 parts by weight to 6 parts by weight based on 100 parts by weight of the rubber component.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a compounding prescription. A rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may include a tire or a tire tread.

EXAMPLES

Hereinafter, the present invention will be explained in more detail referring to embodiments. However, embodiments according to the present invention may be modified into various other types, and the scope of the present invention should not be limited to the embodiments described below. The embodiments of the present invention are provided for completely explaining the present invention to a person having an average knowledge in the art.

Experiment #1

Preparation Example 1

To a 500 ml, round-bottom flask, 100 ml of tetrahydrofuran and 1 g of n-butyllithium (10 wt % in n-hexane) were added, N,N,N',N',1-pentamethyl-1-vinylsilanediamine (molar ratio of 3 mol in contrast to 1 mol of [act. Li]) was added, followed by reacting at 10° C. for 30 minutes to prepare a solution containing a macromonomer (15.6 mmol/l). Through GC analysis, N,N,N',N',1-pentamethyl-1-vinylsilanediamine was not detected after the reaction, and the achievement of the reaction was secured.

Preparation Example 2

A solution containing a macromonomer (15.6 mmol/l) was prepared by the same method in Preparation Example 1 except for reacting N,N,N',N'-tetraethyl-1-methyl-1-vinylsilanediamine (molar ratio of 3 mol in contrast to 1 mol of [act. Li]) instead of N,N,N',N',1-pentamethyl-1-vinylsilanediamine in Preparation Example 1. Through GC analysis, N,N,N',N'-tetraethyl-1-methyl-1-vinylsilanediamine was not detected after the reaction, and the achievement of the reaction was secured.

Example 1

To a 20 L, autoclave reactor, 3 kg of n-hexane, 215 g of styrene, 745 g of 1,3-butadiene and 1.29 g of 2,2-bis(2-oxolanyl)propane as a polar additive were injected, then, 3.2 g of n-butyllithium (10 wt % in n-hexane) was injected, the internal temperature of the reactor was adjusted to 60° C., and an adiabatic reaction with heating was performed. After about 30 minutes lapse, 39 g of 1,3-butadiene was injected for capping the terminals of a polymer with butadiene. After about 10 minutes, N,N-diethyl-3-(trimethoxysilyl)propan-1-amine was injected as a modifier and reacted for 15 minutes (molar ratio of [DTP]:[act. Li]=1.5:1, molar ratio of [modifier]:[act. Li]=0.7:1). Then, the solution containing the macromonomer prepared in Preparation Example 1 was added and reacted for 15 minutes (molar ratio of [act. Li]:[macromonomer]=1:1), and the reaction was quenched using ethanol. 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a modified styrene-butadiene copolymer.

Example 2

A modified styrene-butadiene copolymer was prepared by performing the same method in Example 1 except for adding the solution containing a macromonomer prepared in Preparation Example 2 as the macromonomer (molar ratio of [act. Li]:[macromonomer]=1:1).

Example 3

A modified styrene-butadiene copolymer was prepared by performing the same method in Example 1 except for using N,N-bis(3-(triethoxysilyl)propyl)-3,6,9,12,15-pentaoxanonadecan-1-amine instead of N,N-diethyl-3-(trimethoxysilyl)propan-1-amine as a modifier (molar ratio of [modifier]: [act Li]=0.7:1).

Example 4

A modified styrene-butadiene copolymer was prepared by performing the same method in Example 1 except for using 3,3'-(1,1,3,3-tetramethoxydisiloxane-1,3-diyl)bis(N,N-diethylpropan-1-amine) instead of N,N-diethyl-3-(trimethoxysilyl)propan-1-amine as a modifier (molar ratio of [modifier]: [act Li]=0.7:1).

Example 5

A modified styrene-butadiene copolymer was prepared by performing the same method in Example 1 except for using 3,3'-(piperazine-1,4-diyl)bis(N,N-bis(3-triethoxysilyl)propyl)propan-1-amine) instead of N,N-diethyl-3-(trimethoxysilyl)propan-1-amine as a modifier (molar ratio of [modifier]:[act Li]=0.7:1), and adding the solution containing a macromonomer prepared in Preparation Example 2 as a macromonomer (molar ratio of [act. Li]:[macromonomer]= 1:1).

Comparative Example 1

A modified styrene-butadiene copolymer was prepared by performing the same method in Example 1 except for using the solution containing a macromonomer prepared in Preparation Example 1 instead of the n-butyllithium in Example 1 such that the mol of the macromonomer injected was the same as the n-butyllithium in Example 1, performing the adiabatic reaction with heating, not performing a subsequent step of adding a modifier and a macromonomer and reacting, and quenching the reaction after capping with butadiene.

Comparative Example 2

To a 20 L, autoclave reactor, 3 kg of n-hexane, 215 g of styrene, 745 g of 1,3-butadiene and 1.29 g of 2,2-bis(2-oxolanyl)propane as a polar additive were injected, then, 3.2 g of n-butyllithium (10 wt % in n-hexane) was injected, the internal temperature of the reactor was adjusted to 60° C., and an adiabatic reaction with heating was performed. After about 30 minutes lapse, 39 g of 1,3-butadiene was injected for capping the terminals of a polymer with butadiene. After about 10 minutes, N,N-diethyl-3-(trimethoxysilyl)propan-1-amine was injected as a modifier and reacted for 15 minutes (molar ratio of [DTP]:[act. Li]=1.5:1, molar ratio of [modifier]:[act. Li]=0.7:1). Then, the reaction was quenched using ethanol. 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a modified styrene-butadiene copolymer.

Comparative Example 3

A modified styrene-butadiene copolymer was prepared by performing the same method in Comparative Example 2 except for using 3,3'-(1,1,3,3-tetramethoxydisiloxane-1,3-diyl)bis(N,N-diethylpropan-1-amine) instead of N,N-diethyl-3-(trimethoxysilyl)propan-1-amine as a modifier (molar ratio of [modifier]:[act. Li]=0.7:1).

Comparative Example 4

A modified styrene-butadiene copolymer was prepared by performing the same method in Comparative Example 2 except for using N,N-bis(3-(triethoxysilyl)propyl)-3,6,9,12,15-pentaoxanonadecan-1-amine instead of N,N-diethyl-3-(trimethoxysilyl)propan-1-amine as a modifier (molar ratio of [modifier]:[act. Li]=0.7:1).

Comparative Example 5

A modified styrene-butadiene copolymer was prepared by performing the same method in Comparative Example 2 except for using the solution containing a macromonomer prepared in Preparation Example 1 instead of the n-butyllithium in Comparative Example 2 such that the mol of the macromonomer injected was the same as the n-butyllithium in Comparative Example 2, and performing the adiabatic reaction with heating (molar ratio of [DTP]:[act. Li]=1.5:1, molar ratio of [modifier]:[act Li]=0.7:1).

Comparative Example 6

A modified styrene-butadiene copolymer was prepared by performing the same method in Comparative Example 5 except for using the solution containing a macromonomer prepared in Preparation Example 2 instead of the solution containing a macromonomer prepared in Preparation Example 1, performing the adiabatic reaction with heating, using 3,3'-(piperazine-1,4-diyl)bis(N,N-bis(3-(triethoxysilyl)propyl)propan-1-amine instead of N,N-diethyl-3-(trimethoxysilyl)propan-1-amine as a modifier, and reacting for 15 minutes (molar ratio of [DTP]:[act Li]=1.5:1, molar ratio of [modifier]:[act. Li]=0.7:1).

Evaluation of Properties of Polymers

With respect to each of the modified styrene-butadiene copolymers prepared in the Examples and Comparative Examples, the styrene unit and vinyl contents in each polymer, a weight average molecular weight (Mw, ×10$^3$ g/mol), a number average molecular weight (Mn, ×10$^3$ g/mol), molecular weight distribution (PDI, MWD), mooney viscosity (MV), the change rate of mooney viscosity, and the Si and N contents were measured, respectively. The results are shown in Table 1 below.

1) Styrene Unit and Vinyl Contents (Wt %)

The styrene unit (SM) and vinyl contents in each polymer were measured and analyzed using Varian VNMRS 500 MHz NMR.

When measuring NMR, 1,1,2,2-tetrachloroethane was used as a solvent, and styrene unit and vinyl contents were calculated by calculating a solvent peak as 5.97 ppm, and regarding 7.2-6.9 ppm as random styrene peaks, 6.9-6.2 ppm as block styrene peaks, 5.8-5.1 ppm as 1,4-vinyl peaks, and 5.1-4.5 ppm as 1,2-vinyl peaks.

2) Weight Average Molecular Weight (Mw, ×10$^3$ g/Mol), Number Average Molecular Weight (Mn, ×10$^3$ g/Mol), and Molecular Weight Distribution (PDI, MWD)

By gel permeation chromatography (GPC) analysis, a weight average molecular weight (Mw) and a number average molecular weight (Mn) were measured and a molecular weight distribution curve was obtained. In addition, molecular weight distribution (PDI, MWD, Mw/Mn) was calculated from each molecular weight thus measured. Particularly, GPC was conducted using two columns of PLgel Olexis (Polymer Laboratories Co.) and one column of PLgel mixed-C (Polymer Laboratories Co.) in combination, and polystyrene (PS) as a GPC standard material for calculating the molecular weights. A solvent for measuring GPC was prepared by mixing tetrahydrofuran with 2 wt % of an amine compound.

3) Mooney Viscosity

The mooney viscosity (MV, (ML1+4, @100° C.) MU) was measured by using MV-2000 (ALPHA Technologies Co.) using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for 4 minutes for measurement.

4) Si Content

The Si content was measured by an ICP analysis method, which used an inductively coupled plasma optical emission spectroscopy (ICP-OES; Optima 7300DV). Particularly, measurement was performed by adding about 0.7 g of a specimen to a platinum (Pt) crucible and adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr)

2) step 2: initial temp 180° C., rate (temp/hr) 85° C./hr, temp (holdtime) 370° C. (2 hr)
3) step 3: initial temp 370° C., rate (temp/hr) 47° C./hr, temp (holdtime) 510° C. (3 hr),
adding 1 mL of concentrated nitric acid (48 wt %) and 20 µl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 mL of ultrapure water, and performing incineration.

5) N Content

The N content was measured through an NSX analysis method using a quantitative analyzer of a trace amount of nitrogen (NSX-2100H). Particularly, the quantitative analyzer of a trace amount of nitrogen (Auto sampler, Horizontal furnace, PMT & Nitrogen detector) was turned on, carrier gas flow amounts were set to 250 ml/min for Ar, 350 ml/min for $O_2$, and 300 ml/min for ozonizer, a heater was set to 800° C., and the analyzer was stood for about 3 hours for stabilization. After stabilizing the analyzer, a calibration curve of calibration curve ranges of 5 ppm, 10 ppm, 50 ppm, 100 ppm and 500 ppm was made using Nitrogen standard (AccuStandard S-22750-01-5 ml), and an area corresponding to each concentration was obtained. Then, by using the ratios of concentrations to areas, a straight line was made. After that, a ceramic boat holding 20 mg of a specimen was put in the auto sampler of the analyzer and measurement was conducted to obtain an area. By using the area of the specimen thus obtained and the calibration curve, the N content was calculated.

it could be confirmed that the modified conjugated diene-based polymer according to the present invention was prepared by the preparation method of reacting the macromonomer including the derived repeating unit of the compound represented by Formula 1 with the modified active polymer first chain after modification reaction, the N atoms and Si atoms may be included in the high contents in a polymer.

Evaluation of Properties of Rubber Molded Article

In order to compare and analyze the physical properties of rubber compositions including the modified styrene-butadiene copolymers prepared in the Examples and Comparative Examples, and molded articles manufactured therefrom, tensile properties and viscoelasticity properties were measured, respectively, and the results are shown in Table 3 below.

1) Preparation of Rubber Specimen

Blending was performed using each of the modified or unmodified conjugated diene-based polymers of the Examples, Comparative Examples and Reference Examples as a raw material rubber under the compounding conditions shown in Table 2 below. The raw materials in Table 2 are represented by parts by weight based on 100 parts by weight of the raw material rubber.

TABLE 2

| Division | Raw material | Amount (parts by weight) |
|---|---|---|
| First stage mulling | Rubber | 100 |
| | Silica | 70 |

TABLE 1

| Division | | Example | | | | | Comparative Example | | | | | |
|---|---|---|---|---|---|---|---|---|---|---|---|---|
| | | 1 | 2 | 3 | 4 | 5 | 1 | 2 | 3 | 4 | 5 | 6 |
| NMR (wt %) | SM | 20.9 | 20.8 | 21.0 | 21.0 | 21.3 | 20.6 | 21.0 | 21.3 | 20.9 | 21.0 | 20.8 |
| | Vinyl | 50.2 | 50.2 | 49.7 | 50.1 | 50.0 | 50.5 | 50.2 | 50.1 | 50.47 | 50.0 | 50.6 |
| GPC | Mn ($\times 10^3$, g/mol) | 396 | 373 | 410 | 385 | 505 | 365 | 405 | 380 | 402 | 353 | 502 |
| | Mw ($\times 10^3$, g/mol) | 523 | 485 | 660 | 551 | 884 | 402 | 514 | 467 | 651 | 469 | 889 |
| | PDI | 1.32 | 1.30 | 1.61 | 1.43 | 1.75 | 1.10 | 1.27 | 1.23 | 1.62 | 1.33 | 1.77 |
| Mooney viscosity (MV) | | 63 | 61 | 80 | 73 | 96 | 41 | 62 | 53 | 96 | 58 | 98 |
| Si content (ppm) | | 430 | 418 | 500 | 492 | 663 | 231 | 78 | 155 | 162 | 413 | 641 |
| N content (ppm) | | 382 | 380 | 377 | 419 | 505 | 230 | 39 | 77 | 42 | 372 | 489 |

As shown in Table 1 above, Si and N atoms were present in the polymer molecules in Examples 1 to 5, and the N content and Si content were markedly increased in contrast to Comparative Example 1 to Comparative Example 4. In this case, Comparative Example 1 corresponded to a polymer prepared without using the modifier suggested in the present invention, and Comparative Examples 2 to 4 corresponded to polymers prepared without using the macromonomer suggested in the present invention. From the presence of N atoms and Si atoms in the polymers of Examples 1 to 5 and marked increase of the N content and Si content in contrast to Comparative Examples 1 to 4, it could be anticipated that the modified conjugated diene-based polymer according to the present invention includes a second chain including a repeating unit derived from a compound represented by Formula 1; and a derived unit from an amine-containing alkoxysilane-based modifier, and TABLE 2-continued

| Division | Raw material | Amount (parts by weight) |
|---|---|---|
| | Coupling agent (X50S) | 11.2 |
| | Process oil | 37.5 |
| | zinc oxide | 3 |
| | Stearic acid | 2 |
| | Antioxidant | 2 |
| | Antiaging agent | 2 |
| | wax | 1 |
| Second stage mulling | Sulfur | 1.5 |
| | Rubber accelerator | 1.75 |
| | Vulcanization accelerator | 2 |

Particularly, the rubber specimen was mulled via a first stage mulling and a second stage mulling. In the first stage mulling, a raw material rubber, silica (filler), an organic silane coupling agent (X50S, Evonik), a process oil (TADE oil), zinc oxide (ZnO), stearic acid, an antioxidant (TMQ (RD)) (2,2,4-trimethyl-1,2-dihydroquinoline polymer), an antiaging agent (6PPD ((dimethylbutyl)-N-phenyl-phenylenediamine) and wax (Microcrystaline Wax) were mulled using a banbury mixer equipped with a temperature controlling apparatus. In this case, the initial temperature of a mulling apparatus was controlled to 70° C., and after finishing mixing, a first compound mixture was obtained at a discharge temperature of 145° C. to 155° C. In the second stage mulling, the first compound mixture was cooled to room temperature, and the first compound mixture, sulfur, a rubber accelerator (diphenylguanidine (DPG)), and a vulcanization accelerator (N-cyclohexyl-2-benzothiazylsulfenamide (CZ)) were added to the mulling apparatus and mixed at a temperature of 100° C. or less to obtain a second compound mixture. Then, via a curing process at 160° C. for 20 minutes, a rubber specimen was formed.

2) Tensile Properties

For measuring the tensile properties, each test specimen was manufactured and tensile stress when stretched by 300% (300% modulus) of each specimen was measured according to an ASTM 412 tensile test method. Particularly, tensile properties were measured using a Universal Test Machin 4204 tensile tester (Instron Co.) in a rate of 50 cm/min at room temperature.

3) Viscoelasticity Properties

The viscoelasticity properties were secured by measuring viscoelasticity behavior on thermodynamic deformation at each measurement temperature (−60° C.-60° C.) with a frequency of 10 Hz by using a dynamic mechanical analyzer (GABO Co.) in a film tension mode and securing a tan δ value. From the resultant values, if a tan δ value at a low temperature of 0° C. increases, wet skid resistance becomes better, and if a tan δ at a high temperature of 60° C. decreases, hysteresis loss decreases, and low rotation resistance (fuel consumption ratio) becomes better. The resultant values in Table 3 were indexed (%) based on the resultant values of Comparative Example 1, and thus, the higher numerical value means better results.

4) Processability Properties

By measuring the mooney viscosity (MV, (ML1+4, @100° C.) MU) of the first compound mixture obtained during 1) preparation of rubber specimen, the processability properties of each polymer was compared and analyzed, and in this case, the lower the measured value of the moony viscosity is, the better the processability properties are. The resultant values in Table 3 were indexed (%) based on the resultant values of Comparative Example 2, and thus, the higher numerical value means better results.

Particularly, by using MV-2000 (ALPHA Technologies Co.) using Large Rotor at a rotor speed of 2±0.02 rpm at 100° C., each first compound mixture was stood at room temperature (23±3° C.) for 30 minutes or more, and 27±3 g was collected and put in a die cavity, and then, Platen was operated for 4 minutes for measurement.

TABLE 3

| Division | | Example | | | | | Comparative Example | | | | | |
|---|---|---|---|---|---|---|---|---|---|---|---|---|
| | | 1 | 2 | 3 | 4 | 5 | 1 | 2 | 3 | 4 | 5 | 6 |
| 300% modulus (kgf/cm$^2$) | | 162 | 161 | 164 | 160 | 165 | 148 | 149 | 147 | 152 | 161 | 164 |
| Viscoelasticity properties | tan δ (at 0° C., Index) | 100 | 101 | 103 | 100 | 99 | 100 | 96 | 99 | 97 | 98 | 99 |
| | tan δ (at 60° C., Index) | 118 | 119 | 124 | 122 | 121 | 100 | 97 | 98 | 102 | 118 | 120 |
| Processability properties (Index) | | 103 | 102 | 104 | 104 | 102 | 94 | 100 | 98 | 102 | 74 | 72 |

As shown in Table 3, it was confirmed that the modified styrene-butadiene copolymers of Examples 1 to 5 in which the reaction with the macromonomer was performed after the modification reaction using the modifier according to an embodiment of the present invention, showed excellent processability properties and at the same time, excellent tensile properties and viscoelasticity properties when compared with Comparative Examples 1 to 6.

Particularly, Examples 1 to 5 showed improved viscoelasticity properties and markedly improved processability, while showing equal or better tensile properties when compared with Comparative Examples 5 and 6. In this case, Comparative Example 5 and Comparative Example 6 corresponded to modified styrene-butadiene copolymers prepared by the same method in Example 1 and Example 5, respectively, except for using the macromonomers in Example 1 and Example 5 as modification initiators, but not performing the step of reacting with the macromonomers after modification reaction.

Though the difference in the preparation methods in Example 1 and Example 5 from Comparative Example 5 and Comparative Example 6, and the same containing level of the Si content and N content in polymers, through the marked difference of effects of Example 1 and Example 5 from Comparative Example 5 and Comparative Example 6, it could be anticipated that the modified conjugated diene-based polymer of the present invention is a copolymer having a different structure from Comparative Example 5 and Comparative Example 6, for example, a structure like a graft copolymer through the coupling of the second chain including the repeating unit derived from the compound represented by Formula 1 derived from the macromonomer with the modified polymer first chain via the derived unit from a modifier. It could be confirmed that tensile properties, viscoelasticity properties and processability properties were markedly excellent in balance due to such structural difference (refer to Table 1 and Table 3).

Experiment #2

Preparation Example 3

To a 500 ml, round-bottom flask, 100 ml of tetrahydrofuran and 1 g of n-butyllithium (10 wt % in n-hexane) were added, then, N,N,N',N',1-pentamethyl-1-vinylsilandiamine (molar ratio of 3 mol in contrast to 1 mol of [act. Li]) was added, followed by reacting at 10° C. for 30 minutes to prepare a solution containing a macromonomer (15.6 mmol/l). Through GC analysis, the achievement of the reaction was secured through that N,N,N',N',1-pentamethyl-1-vinylsilandiamine was not detected after the reaction.

Preparation Example 4

A solution containing a macromonomer (15.6 mmol/l) was prepared by the same method in Preparation Example 3 except for reacting N,N,N',N'-tetraethyl-1-methyl-1-vinylsilandiamine (molar ratio of 3 mol in contrast to 1 mol of [act. Li]) instead of N,N,N',N',1-pentamethyl-1-vinylsilandiamine as a modifier. Through GC analysis, the achievement of the reaction was secured through that N,N,N',N'-tetraethyl-1-methyl-1-vinylsilandiamine was not detected after the reaction, and molecular weight analysis was conducted by the same method in Preparation Example 3.

Example 6

To a 20 L, autoclave reactor, 3 kg of n-hexane, 215 g of styrene, 745 g of 1,3-butadiene and 1.29 g of 2,2-bis(2-oxolanyl)propane as a polar additive were injected, then, 3.2 g of n-butyllithium (10 wt % in n-hexane) was injected, the internal temperature of the reactor was adjusted to 60° C., and an adiabatic reaction with heating was performed. After about 30 minutes lapse, 39 g of 1,3-butadiene was injected for capping the terminals of a polymer with butadiene. After about 10 minutes, tetramethoxysilane was injected as a modifier and reacted for 15 minutes (molar ratio of [DTP]: [act. Li]=1.5:1, molar ratio of [modifier]:[act. Li]=0.7:1). Then, the solution containing the macromonomer prepared in Preparation Example 3 was added and reacted for 15 minutes (molar ratio of [act. Li]:[macromonomer]=1:1), and the reaction was quenched using ethanol. 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a modified styrene-butadiene copolymer.

Example 7

A modified styrene-butadiene copolymer was prepared by performing the same method in Example 6 except for using 3,3,7,7-tetramethoxy-5,5-bis((trimethoxysilyl)methyl)-2,8-dioxa-3,7-disilanonane instead of tetramethoxysilane as a modifier (molar ratio of [modifier]:[act Li]=0.2:1).

Example 8

A modified styrene-butadiene copolymer was prepared by performing the same method in Example 6 except for using dodecamethyl pentaorthosilicate instead of tetramethoxysilane as a modifier (molar ratio of [modifier]:[act Li]=0.2:1).

Example 9

A modified styrene-butadiene copolymer was prepared by performing the same method in Example 6 except for adding the solution containing a macromonomer prepared in Preparation Example 4 as a macromonomer (molar ratio of [modifier]:[act Li]=1:1).

Comparative Example 7

A modified styrene-butadiene copolymer was prepared by performing the same method in Example 6 except for using the solution containing a macromonomer prepared in Preparation Example 3 instead of the n-butyllithium in Example 6 such that the mol of the macromonomer injected was the same as the n-butyllithium in Example 6, performing the adiabatic reaction with heating, not performing a subsequent step of adding a modifier and a macromonomer and reacting, and quenching the reaction after capping with butadiene.

Comparative Example 8

To a 20 L, autoclave reactor, 3 kg of n-hexane, 215 g of styrene, 745 g of 1,3-butadiene and 1.29 g of 2,2-bis(2-oxolanyl)propane as a polar additive were injected, then, 3.2 g of n-butyllithium (10 wt % in n-hexane) was injected, the internal temperature of the reactor was adjusted to 60° C., and an adiabatic reaction with heating was performed. After about 30 minutes lapse, 39 g of 1,3-butadiene was injected for capping the terminals of a polymer with butadiene. After about 10 minutes, tetramethoxysilane was injected as a modifier and reacted for 15 minutes (molar ratio of [DTP]: [act. Li]=1.5:1, molar ratio of [modifier]:[act. Li]=0.7:1). Then, the reaction was quenched using ethanol. 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a modified styrene-butadiene copolymer.

Comparative Example 9

A modified styrene-butadiene copolymer was prepared by performing the same method in Comparative Example 8 except for using the solution containing a macromonomer prepared in Preparation Example 3 instead of the n-butyllithium in Comparative Example 8 such that the mol of the macromonomer injected was the same as the n-butyllithium in Comparative Example 8, and performing the adiabatic reaction with heating.

Evaluation of Properties of Polymers

With respect to each of the modified styrene-butadiene copolymers prepared in the Examples and Comparative Examples, the styrene unit and vinyl contents in each polymer, a weight average molecular weight (Mw, ×10³ g/mol), a number average molecular weight (Mn, ×10³ g/mol), molecular weight distribution (PDI, MWD), mooney viscosity (MV), the Si content and the N content were measured, respectively by the same method in Experiment #1. The results are shown in Table 4 below.

TABLE 4

| | Division | Example | | | | Comparative Example | | |
|---|---|---|---|---|---|---|---|---|
| | | 6 | 7 | 8 | 9 | 7 | 8 | 9 |
| NMR (wt %) | SM | 21 | 21 | 21 | 21 | 21 | 21 | 21 |
| | Vinyl | 50 | 50 | 50 | 50 | 50 | 50 | 50 |
| GPC | Mn (×10³, g/mol) | 405 | 360 | 420 | 406 | 365 | 403 | 395 |
| | Mw (×10³, g/mol) | 559 | 569 | 777 | 557 | 402 | 544 | 545 |
| | PDI | 1.38 | 1.58 | 1.85 | 1.37 | 1.10 | 1.35 | 1.38 |
| Mooney viscosity (MV) | | 70 | 72 | 111 | 69 | 41 | 67 | 68 |
| Si content (ppm) | | 416 | 534 | 530 | 410 | 220 | 78 | 401 |
| N content (ppm) | | 330 | 415 | 400 | 331 | 234 | — | 332 |

As shown in Table 4 above, in Examples 6 to 9, the N content and Si content in polymers were largely increased in contrast to Comparative Example 7 and Comparative Example 8. In this case, Comparative Example 7 corresponded to a polymer prepared without using the modifier, and Comparative Example corresponded to a polymer prepared without using the macromonomer suggested in the present invention. From the marked increase of the Si content and N content in the polymers in Examples 6 to 9 in contrast to Comparative Examples 7 and 8, it could be anticipated that the modified conjugated diene-based polymer according to the present invention includes the second chain including the repeating unit derived from the compound represented by Formula 1; and the derived unit from the non-amine-containing alkoxysilane-based modifier.

Evaluation of Properties of Rubber Molded Article

In order to compare and analyze the physical properties of rubber compositions including the modified styrene-butadiene copolymers prepared in the Examples and Comparative Examples, and molded articles manufactured therefrom, tensile properties and viscoelasticity properties were measured, respectively, by the same method in Experiment #1, and the results are shown in Table 5 below. The rubber molded article (specimen) was also manufactured by the same method in Experiment #1.

TABLE 5

| Division | | Example | | | | Comparative Example | | |
|---|---|---|---|---|---|---|---|---|
| | | 6 | 7 | 8 | 9 | 7 | 8 | 9 |
| 300% modulus (Index) | | 163 | 162 | 160 | 165 | 148 | 152 | 165 |
| Visco-elasticity properties | tan δ (at 0° C., Index) | 102 | 105 | 104 | 105 | 100 | 102 | 99 |
| | tan δ (at 60° C., Index) | 113 | 115 | 116 | 112 | 100 | 91 | 112 |
| Processability properties (Index) | | 102 | 101 | 99 | 98 | 92 | 100 | 86 |

In Table 5 above, the resultant values of viscoelasticity properties were indexed (%) based on the resultant values of Comparative Example 7, and the processability properties were indexed based (%) on the resultant values of Comparative Example 8, and the higher values mean the better properties.

As shown in Table 5, it was confirmed that the modified styrene-butadiene copolymers of Examples 6 to 9 which were obtained by reacting with the macromonomer after modification reaction using the modifier according to an embodiment of the present invention, showed excellent processability properties and at the same time, excellent tensile properties and viscoelasticity properties when compared with Comparative Examples 7 to 9.

Particularly, Example 6 showed equally excellent tensile properties, improved viscoelasticity properties and markedly improved processability properties when compared with Comparative Example 9. In this case, Comparative Example 9 was the modified styrene-butadiene copolymer prepared by the same method in Example 6 except for using the macromonomer as a modification initiator in Example 6.

Though the difference in the preparation methods in Example 6 and Comparative Example 9, and the same containing level of the Si content and N content in polymers, through the marked difference of effects of Example 6 and Comparative Example 9, it could be anticipated that the modified conjugated diene-based polymer of the present invention is a polymer having a different structure from Comparative Example 9, for example, a structure like a graft copolymer through the coupling of the second chain including the repeating unit derived from the compound represented by Formula 1 derived from the macromonomer with the modified polymer first chain via the derived unit from the modifier. It could be confirmed that tensile properties, viscoelasticity properties and processability properties were markedly excellent in balance due to such structural difference (refer to Table 4 and Table 5).

The invention claimed is:
1. A modified conjugated diene-based polymer, comprising:
a first chain consisting of a repeating unit derived from a conjugated diene-based monomer or a repeating unit derived from a conjugated diene-based monomer and a repeating unit derived from an aromatic vinyl-based monomer;
a second chain consisting of a repeating unit derived from a compound represented by the following Formula 1, or the repeating unit derived from the compound represented by the following Formula 1 and a derived unit from a conjugated diene-based monomer; and
a derived unit from an alkoxysilane-based modifier,
wherein the first chain and the second chain are coupled by the derived unit from the alkoxysilane-based modifier:

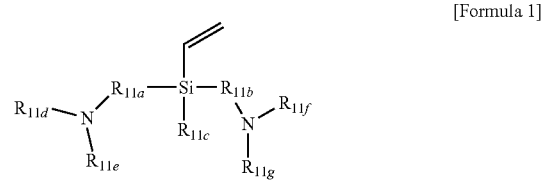

[Formula 1]

in Formula 1,
$R_{11a}$ and $R_{11b}$ are each independently a single bond, a substituted or unsubstituted alkylene group of 1 to 20 carbon atoms, a substituted or unsubstituted cycloalkylene group of 5 to 20 carbon atoms, or a substituted or unsubstituted arylene group of 6 to 20 carbon atoms, wherein the substituted $R_{11a}$ and $R_{11b}$ are substituted with an alkyl group of 1 to 10 carbon atoms, a cycloalkyl group of 5 to 10 carbon atoms, or an aryl group of 6 to 20 carbon atoms,
$R_{11c}$ is an alkyl group of 1 to 20 carbon atoms, an alkynyl group of 2 to 20 carbon atoms, a heteroalkyl group of 1 to 20 carbon atoms, a heteroalkenyl group of 2 to 20 carbon atoms, a heteroalkynyl group of 2 to 20 carbon atoms; a cycloalkyl group of 5 to 20 carbon atoms, an aryl group of 6 to 20 carbon atoms, or a heterocyclic group of 3 to 20 carbon atoms, and
$R_{11d}$ to $R_{11g}$ are each independently an alkyl group of 1 to 20 carbon atoms, an alkenyl group of 2 to 20 carbon atoms, an alkynyl group of 2 to 20 carbon atoms, a heteroalkyl group of 1 to 20 carbon atoms, a heteroalkenyl group of 2 to 20 carbon atoms, a heteroalkynyl group of 2 to 20 carbon atoms, a cycloalkyl group of 5 to 20 carbon atoms, an aryl group of 6 to 20 carbon atoms; a heterocyclic group of 3 to 20 carbon atoms, or a mono-substituted, di-substituted or tri-substituted alkylsilyl group with alkyl groups of 1 to 10 carbon atoms.
2. The modified conjugated diene-based polymer of claim 1, wherein in Formula 1,
$R_{11a}$ and $R_{11b}$ are each independently a single bond or an unsubstituted alkylene group of 1 to 10 carbon atoms,
$R_{11c}$ is an alkyl group of 1 to 10 carbon atoms, and
$R_{11d}$ to $R_{11g}$ are each independently an alkyl group of 1 to 10 carbon atoms; or a mono-substituted, di-substituted or tri-substituted alkylsilyl group with alkyl groups of 1 to 10 carbon atoms.

3. The modified conjugated diene-based polymer of claim 1, wherein
in Formula 1,
$R_{11a}$ and $R_{11b}$ are each independently a single bond or an unsubstituted alkylene group of 1 to 6 carbon atoms,
$R_{11c}$ is an alkyl group of 1 to 6 carbon atoms, and
$R_{11d}$ to $R_{11g}$ are each independently an alkyl group of 1 to 6 carbon atoms; or a substituted trialkylsilyl group with an alkyl group of 1 to 6 carbon atoms.

4. The modified conjugated diene-based polymer of claim 1, wherein a number average molecular weight (Mn) is 1,000 g/mol to 2,000,000 g/mol, a weight average molecular weight (Mw) is 1,000 g/mol to 3,000,000 g/mol, and a peak average molecular weight (Mp) is 1,000 g/mol to 3,000,000 g/mol.

5. A method for preparing the modified conjugated diene-based polymer of claim 1, the method comprising:
polymerizing a conjugated diene-based monomer, or a conjugated diene-based monomer and an aromatic vinyl-based monomer, in the presence of a polymerization initiator in a carbon solvent to prepare an active first chain;
reacting the active first chain with an alkoxysilane-based modifier to prepare a modified active first chain; and
reacting the modified active first chain and a macromonomer consisting of a repeating unit derived from a compound represented by the following Formula 1, or the repeating unit derived from the compound represented by the following Formula 1 and a derived unit from a conjugated diene-based monomer to prepare a modified conjugated diene-based polymer:

[Formula 1]

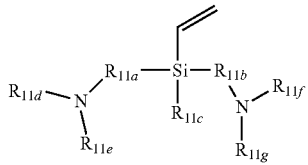

in Formula 1,
$R_{11a}$ and $R_{11b}$ are each independently a single bond, a substituted or unsubstituted alkylene group of 1 to 20 carbon atoms, a substituted or unsubstituted cycloalkylene group of 5 to 20 carbon atoms, or a substituted or unsubstituted arylene group of 6 to 20 carbon atoms, wherein the substituted
$R_{11a}$ and $R_{11b}$ are substituted with an alkyl group of 1 to 10 carbon atoms, a cycloalkyl group of 5 to 10 carbon atoms, or an aryl group of 6 to 20 carbon atoms,
$R_{11c}$ is an alkyl group of 1 to 20 carbon atoms, an alkynyl group of 2 to 20 carbon atoms, a heteroalkyl group of 1 to 20 carbon atoms, a heteroalkenyl group of 2 to 20 carbon atoms, a heteroalkynyl group of 2 to 20 carbon atoms, a cycloalkyl group of 5 to 20 carbon atoms, an aryl group of 6 to 20 carbon atoms, or a heterocyclic group of 3 to 20 carbon atoms, and
$R_{11d}$ to $R_{11g}$ are each independently an alkyl group of 1 to 20 carbon atoms, an alkenyl group of 2 to 20 carbon atoms, an alkynyl group of 2 to 20 carbon atoms, a heteroalkyl group of 1 to 20 carbon atoms, a heteroalkenyl group of 2 to 20 carbon atoms, a heteroalkynyl group of 2 to 20 carbon atoms, a cycloalkyl group of 5 to 20 carbon atoms; an aryl group of 6 to 20 carbon atoms, a heterocyclic group of 3 to 20 carbon atoms, or a mono-substituted, di-substituted or tri-substituted alkylsilyl group with alkyl groups of 1 to 10 carbon atoms.

6. The method for preparing the modified conjugated diene-based polymer of claim 5, wherein the macromonomer is prepared by low-degree polymerization reaction of the compound represented by Formula 1, or the compound represented by Formula 1 and a conjugated diene-based monomer, in the presence of an organolithium compound in a hydrocarbon solvent.

7. The method for preparing the modified conjugated diene-based polymer of claim 5, wherein the modifier is used in 0.1 mol to 10 mol based on 1 mol of the polymerization initiator.

8. The method for preparing the modified conjugated diene-based polymer of claim 7, wherein the macromonomer is used in 0.1 to 4.0 mol based on 1 mol of the polymerization initiator.

9. A rubber composition comprising the modified conjugated diene-based polymer of claim 1, and a filler.

10. The rubber composition of claim 9, wherein the rubber composition comprises 0.1 parts by weight to 200 parts by weight of the filler based on 100 parts by weight of the modified conjugated diene-based polymer.

* * * * *